United States Patent [19]
Dinsmore

[11] Patent Number: 5,631,999
[45] Date of Patent: May 20, 1997

[54] ADAPTIVE COMPENSATION FOR HARD DISC DRIVE SPINDLE MOTOR MANUFACTURING TOLERANCES

[75] Inventor: Stanley H. Dinsmore, Concord, Calif.

[73] Assignee: Seagate Technology Inc., Scotts Valley, Calif.

[21] Appl. No.: 524,342

[22] Filed: Sep. 6, 1995

[51] Int. Cl.$^6$ ........................................ H02P 5/06
[52] U.S. Cl. .................... 388/805; 318/254; 318/138; 318/439
[58] Field of Search .................... 318/254, 138, 318/439, 606, 607, 504, 638, 632, 503, 798–815; 388/805, 820, 814, 812, 912; 369/270, 266, 267

[56] References Cited

U.S. PATENT DOCUMENTS

| | | | |
|---|---|---|---|
| 3,794,899 | 2/1974 | Breslow | 318/602 X |
| 3,996,454 | 12/1976 | Froyd | 318/564 X |
| 4,063,146 | 12/1977 | Oliver | 388/820 X |
| 4,654,566 | 3/1987 | Erdman | 318/254 |
| 4,811,835 | 3/1989 | Bullivant et al. | 318/138 X |

*Primary Examiner*—Karen Masih
*Attorney, Agent, or Firm*—Bill D. McCarthy; Edward P. Heller, III; Randall K. McCarthy

[57] ABSTRACT

Apparatus and method for adaptively compensating for variations in rotational speed of a back emf commutated spindle motor in a hard disc drive. After the motor achieves nominal operating speed, the hard disc drive enters a learn mode during which systematic variations in operational speed of the spindle motor are characterized over a plurality of rotations, including characterization of the average timing of zero crossing signals with respect to reference frequency periods and characterization of the average time between successive zero crossing signals. The hard disc drive next enters a compensation mode, during which modified speed control timing signals and modified commutation timing signals are outputted in response to the average timing characterized during the learn mode.

12 Claims, 12 Drawing Sheets

| STEPS | PHASE A | PHASE B | PHASE C |
|-------|---------|---------|---------|
| 1 | HIGH | LOW | HI-Z |
| 2 | HI-Z | LOW | HIGH |
| 3 | LOW | HI-Z | HIGH |
| 4 | LOW | HIGH | HI-Z |
| 5 | HI-Z | HIGH | LOW |
| 6 | HIGH | HI-Z | LOW |

| STEP | SIGNAL PATH | | | | | |
|---|---|---|---|---|---|---|
| | 182 | 184 | 186 | 188 | 190 | 192 |
| 1 | 1 | 0 | 0 | 0 | 1 | 0 |
| 2 | 0 | 0 | 1 | 0 | 1 | 0 |
| 3 | 0 | 0 | 1 | 1 | 0 | 0 |
| 4 | 0 | 1 | 0 | 1 | 0 | 0 |
| 5 | 0 | 1 | 0 | 0 | 0 | 1 |
| 6 | 1 | 0 | 0 | 0 | 0 | 1 |

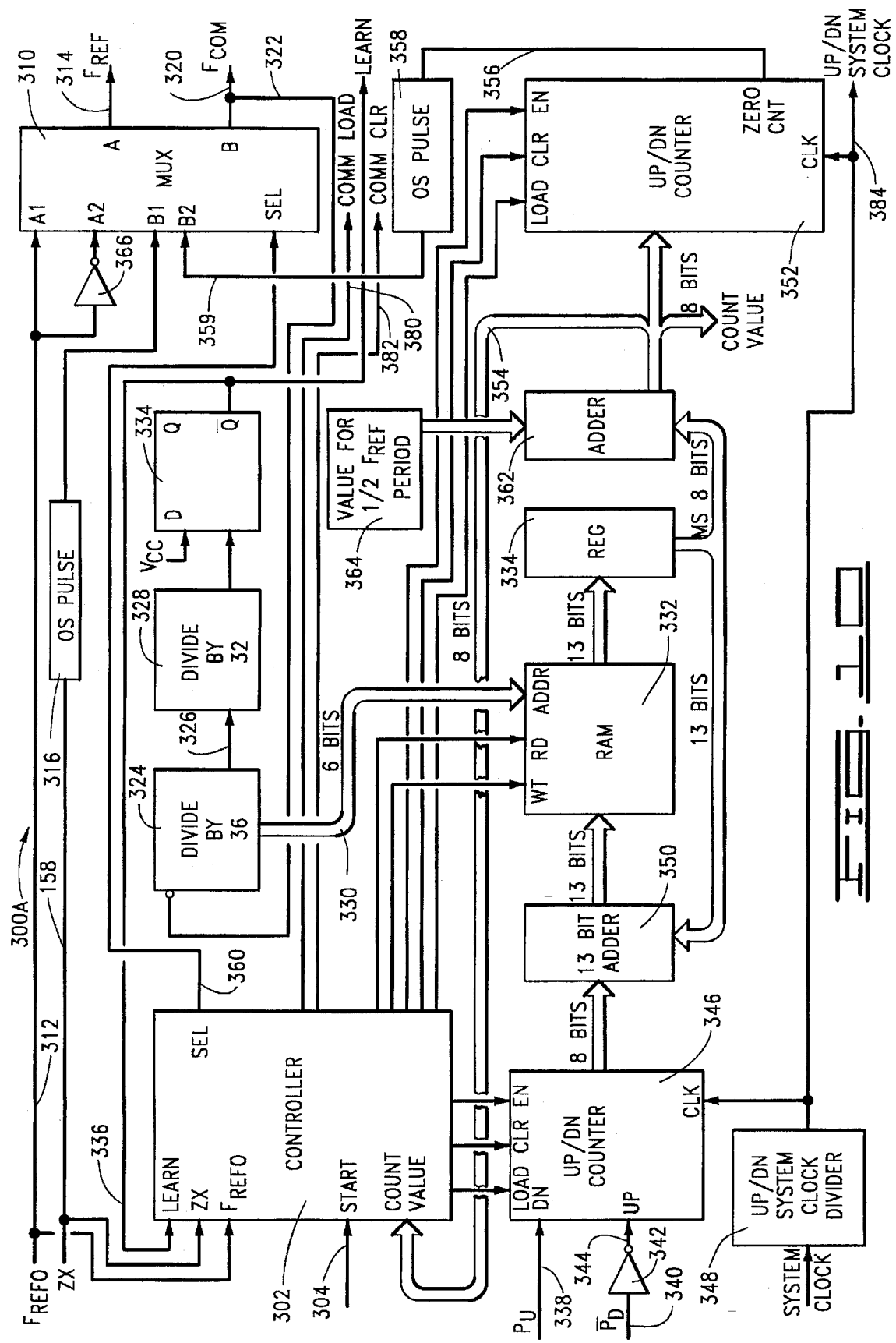

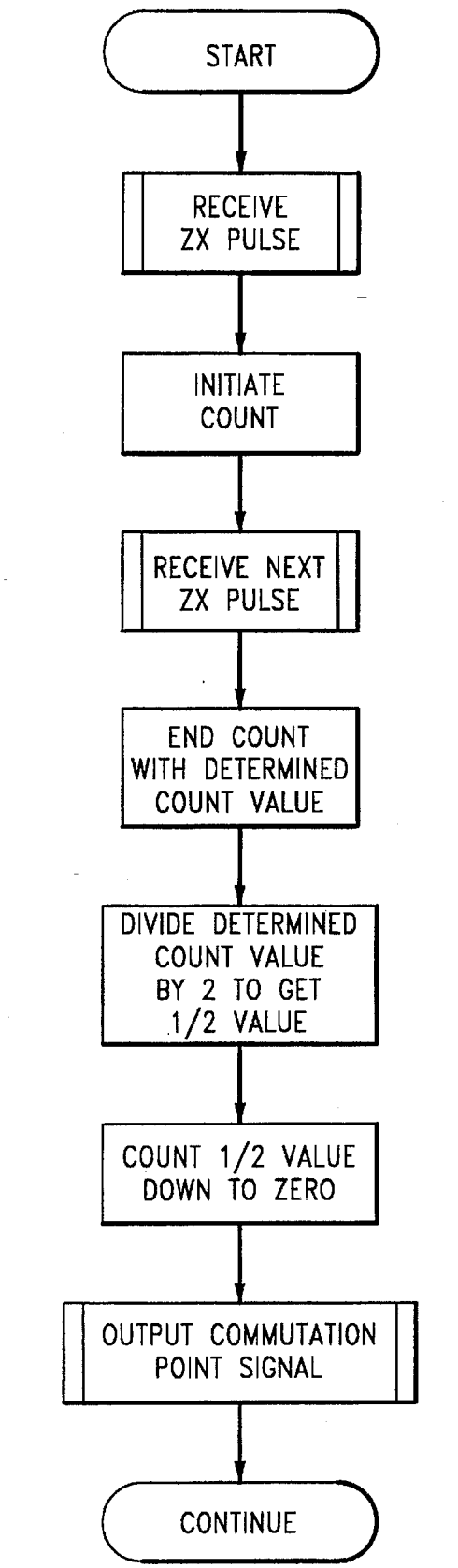
FIG-12

ADAPTIVE COMPENSATION FOR HARD DISC DRIVE SPINDLE MOTOR MANUFACTURING TOLERANCES

BACKGROUND OF THE INVENTION

1. Field of the Invention

The present invention relates generally to improvements in the operation of hard disc drives, and more particularly, but not by way of limitation, to an apparatus and method for adaptively compensating for variations in rotational speed of a hard disc drive spindle motor to reduce the effects of spindle motor manufacturing tolerances.

2. Brief Description of the Prior Art

Hard disc drives have become increasingly popular in recent times as long term storage devices for personal computers. Such drives include a plurality of rigid discs having magnetizable coatings to which data can be written by magnetizing successive data cells defined along concentric data tracks of the discs. Because of the rigidity of the discs, the further inclusion of a servo system which is capable of precise track following permits the data tracks to be very closely spaced so that a hard disc drive can store a very large amount of data in a very small volume.

With the advance of computer technology, an important characteristic of hard disc drives is "access time" of the drive, which is a measure of the typical time during which the disc drive is unavailable to carry out its functions of storing data supplied by the computer and retrieving data previously supplied by the computer for storage. Access time generally includes overhead, which is time required by the disc drive to service its own internal operations, seek time, which is time required for a read/write transducer head to seek to a desired data track, and latency, which is the time required for a particular sector on the desired data track to reach the transducer head as the disc is rotated under the transducer head. As will be recognized by those skilled in the art, efforts to reduce access time have included reductions in latency by increasing the operating rotational speed of the discs so that, once the transducer head has been moved to the appropriate data track, the time required for the particular sector to reach the transducer head is minimized.

Modern disc drives use brushless dc motors, or spindle motors, to rotate the discs at the desired operating rotational speed. These motors generally have a stationary stator containing a plurality of phases, each phase having one or more sets of electrical windings that are wrapped around poles within the stator with the sets of windings in each phase being electrically connected in series. Each phase is generally connected in parallel with the other phases so that all phases share a common center tap in a "Y" or a "star" configuration. The motors also have a rotatable rotor that contains a plurality of permanent magnet segments.

The discs are mechanically mounted to the rotor and rotated by the energizing of the windings within a phase in the stator to induce magnetic fields that interact with the permanent magnet segments in the rotor to cause the rotor, and the discs, to rotate in the desired direction at the desired operating speed. The selective energizing of phases in the stator in a predetermined sequence is known as commutation of the motor, which simply involves providing a series of timed commutation steps wherein energy is imparted to the motor to cause it to rotate. The time between each commutation step is called a commutation period, and the number of commutation periods within one mechanical revolution of the motor is a function of the number of phases and the total number of north and south poles in the motor magnet segments. For example, a three phase, twelve pole motor would have 36 commutation steps and 36 corresponding commutation periods in each mechanical revolution of the motor, with each commutation step occurring at a unique mechanical alignment of a winding and a pole, where a switch is made from one configuration or commutation step to the next.

As understood in the art, a commutation step involves supplying the motor with current to one phase, sinking current from another phase, and holding a third phase at a high impedance so that it remains unenergized. A commutation cycle is defined as a complete sequence of commutation steps such that every phase has in turn sourced current, sunk current, and remained unenergized. The proper sequencing and timing of commutation steps will cause the motor to rotate in the desired direction at the desired speed, and generally there will be a plurality of commutation cycles for each mechanical revolution of the motor. The sequencing and timing of commutation steps are supplied to the motor by commutation circuitry to cause the motor to rotate at the desired operating speed.

Typically, modern disc drives have a back emf sense circuit that measures the back emf generated on the unenergized phase held at high impedance, compares this voltage to the voltage on the center tap and generates a signal at a zero crossing of the voltages, that is, when the back emf voltage changes polarity with respect to the voltage on the center tap. The point at which the zero crossing occurred is then used as a reference for the generation of the timing of the next commutation pulse, as well as a reference to indicate the position and relative speed of the motor.

It will be recognized by those of skill in the art that slight variations exist in the operating speed of a spindle motor during operation, and that it becomes increasingly important to control and minimize these variations as the operating speed is increased to ensure proper alignment of the transducer head and the sector before data is stored or retrieved from a disc.

One significant source of variation in the operating speed of a disc comes from manufacturing tolerances within the spindle motor itself. These manufacturing tolerances may be due to variations in bearings and bearing surfaces, variations in field strength of permanent magnets in the spindle motor, variations in resistance and inductance in phase windings in the spindle motor and most importantly, the variation in the spacing of the magnetic poles and the slots between windings. These variations can significantly affect the timing of the zero crossings, which in turn will affect the timing of the subsequent commutation steps and will affect the ability of the speed control circuitry to maintain the rotation of the discs at a constant speed.

Further, before data may be stored on a particular sector in a data track, the transducer head must first locate the correct data track and detect the boundary of the correct sector as it passes under the transducer head, so the variations in the operating speed of the discs typically requires the use of larger timing windows to detect the proper sector boundary than would be necessary if the motor were running at near zero speed variation.

A problem in many prior art hard disc drives that use such back emf sensing and commutation timing methods is the use of previous zero crossing periods to determine the timing of subsequent commutation steps. For example, one approach involves the placement of subsequent commutation steps at a point in time beyond the most recent zero crossing by an amount equal to one-half of the time that elapsed between the most recent zero crossing and the next most recent zero crossing, or one-half the previous zero crossing period. Because of the variation associated with the timing of the zero crossings due to manufacturing tolerances in the spindle motor, significant error can exist in the placement of commutation steps based on the previous zero crossing period, causing further motor speed variations.

A related problem in many such prior art hard disc drives follows from the use of zero crossings to indicate the motor speed and position; because of the variations in zero crossings due to manufacturing tolerances within the spindle motor, the motor speed control may provide unnecessary compensation of the motor speed at subsequent commutation steps. For example, if as a result of manufacturing tolerances a zero crossing occurs at a point in time that indicates the motor is running too fast, when in fact the motor is running at the correct speed, the speed control circuitry may unnecessarily cause the motor to slow down by reducing the supplied current. It has been observed that a certain amount of this error can be systematic for each mechanical rotation of the discs in a motor; a motor running through each mechanical revolution may be sped up or slowed down at the same steps based on these manufacturing variations, while maintaining an overall average constant speed.

There is a need, therefore, for an improved disc drive motor control circuit that compensates for systematic variations in disc rotational speed as a result of the effects of motor manufacturing tolerances and provides improved speed control to allow for increases in motor speed and decreases in required timing windows.

SUMMARY OF THE INVENTION

The present invention provides an apparatus and a method for adaptively compensating for variations in rotational speed of a spindle motor in a disc drive by taking and storing timing measurements after the spindle motor has reached nominal operating speed and then using these measurements during operation of the spindle motor to reduce the effects of variations in timing that are due to manufacturing tolerances within the spindle motor.

More particularly, the present invention comprises an improved apparatus and method for improving the operation of a hard disc drive spindle motor by reducing the effects of systematic variations in motor rotational speed, including characterization means for characterizing systematic variations in operational speed of the spindle motor over a plurality of rotations during nominal operation of the spindle motor. The characterization means includes speed control averaging means for characterizing the average timing of zero crossing signals with respect to reference frequency periods and commutation timing averaging means for characterizing the average time between successive zero crossing signals.

Additionally, the invention includes compensation means to compensate for the systematic variations in operational speed of the spindle motor. The compensation means includes speed control compensation means, responsive to the speed control averaging means, for outputting modified speed control timing signals, the speed control timing signals modified in response to the average timing characterized by the speed control averaging means and the commutation timing compensation means, responsive to the commutation timing averaging means, for outputting modified commutation timing signals, the commutation timing signals modified in response to the average time characterized by the commutation timing averaging means.

The commutation timing of the spindle motor is improved by using the present zero crossing period, rather than the previous zero crossing period, to generate the timing of subsequent commutation steps. After the motor is started and achieves nominal operating speed, the hard disc drive enters a characterization mode wherein the error associated with each zero crossing period within a mechanical revolution of the spindle motor is measured as a phase difference between a predetermined portion of each zero crossing period and a corresponding portion of a nominal zero crossing period. The nominal zero crossing period is defined as the time between the reference pulses supplied by the reference clock, where the reference pulses occur at nominal zero crossings. The measured phase differences are then averaged over a plurality of mechanical revolutions to provide an average phase difference for each zero crossing period in a mechanical revolution of the discs.

After the average phase difference is found, the hard disc drive enters a compensation mode of operation, wherein the average phase differences are used to locate the commutation steps at a location in time beyond the most recent reference pulse by an amount equal to the predetermined portion of the reference period adjusted by the average phase difference determined for that zero crossing period. In a preferred embodiment, the predetermined portion of the zero crossing period, the nominal zero crossing period, and the reference period is one-half (½) of these periods.

The speed control circuitry used to control the speed of the spindle motor is improved by using an average of the phase difference between the zero crossings and the associated nominal zero crossings to provide a reference for the motor speed and location. After the motor is started and running at operating speed, while the hard disc drive is in the characterization mode, the error associated with each zero crossing within a mechanical revolution of the spindle motor is measured as a phase difference between each zero crossing and each associated nominal zero crossing. The measured phase differences are then averaged over a plurality of mechanical revolutions to provide an average phase difference for each zero crossing in a mechanical revolution of the discs.

After the average phase difference is found, the hard disc drive enters the compensation mode of operation, wherein the average phase differences are used as a reference for the speed control circuitry. For each nominal zero crossing period, the average phase difference is retrieved and used to derive an adaptive zero crossing from the nominal zero crossing by offsetting the nominal zero crossing by the average phase difference. Phase difference signals for use by the speed control circuitry are then generated by determining the phase difference between the zero crossing and the adaptive zero crossing.

An object of the present invention is to provide an improved apparatus and method for back emf commutation timing and speed control in hard disc drives.

Another object of the present invention is to characterize variations in zero crossings and zero crossing periods in a mechanical revolution of the discs.

Still another object of the present invention is to compensate for these variations in zero crossings and zero crossing periods to reduce variation in the operating speed of the discs.

Yet another object of the present invention is to allow the use of spindle motors with larger mechanical and electrical tolerances without significantly degrading performance within a hard disc drive.

Still yet another object of the present invention is to allow for the tightening of sector boundary detection tolerances within a hard disc drive while using the same spindle motor.

Other objects, features and advantages of the present invention will become apparent from the following detailed description when read in conjunction with the drawings and appended claims.

BRIEF DESCRIPTION OF THE DRAWING

FIG. 8 is a schematic block diagram showing the preferred embodiment of the present invention using a phase lock implementation to provide spindle motor commutation timing and speed control.

FIG. 9 is a schematic block diagram of a first preferred embodiment of the adaptive speed control pulse generator shown in FIG. 8.

FIG. 10 is a schematic block diagram of a second preferred embodiment of the adaptive speed control pulse generator shown in FIG. 8.

FIG. 12 is a flow chart showing the general steps performed by the commutation pulse generator of FIG. 11.

DETAILED DESCRIPTION OF THE PRIOR ART

Before discussing the preferred embodiments of the present invention, it will be useful to first describe the prior art and FIGS. 1 through 7 have been provided for this purpose.

Figure 1:
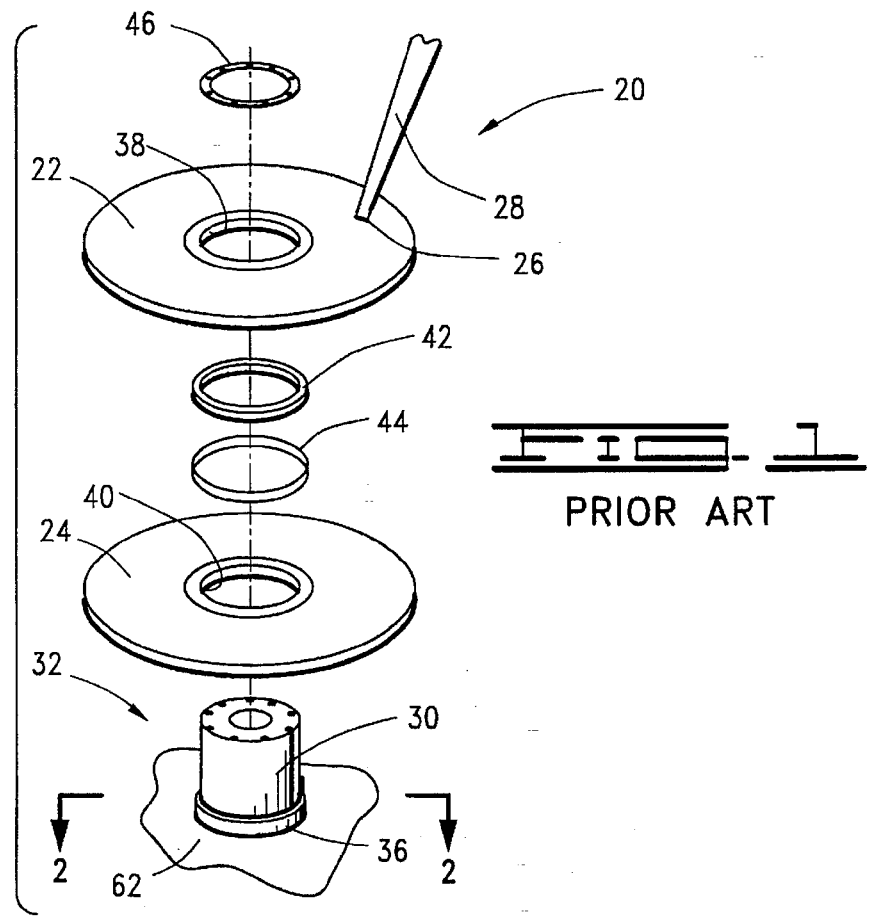
FIG. 1 is a fragmentary, exploded, perspective view of a conventional hard disc drive, including a spindle motor and associated components.

Referring to FIG. 1, a hard disc drive, generally designated by the reference numeral 20, is typically composed of a plurality of rigid discs, two of which are shown in FIG. 1 and designated therein as 22 and 24, that have magnetizable surface coatings. When the discs are rotated about their axes, data can be written to the discs or read therefrom by transducer heads that are positioned adjacent their surfaces in the manner shown for the disc 22 and a transducer head 26. The transducer heads are mounted on support arms, such as the support arm 28, carried by an actuator (not shown) that moves the arms to radially position the transducer heads above concentric data tracks (not shown) defined on the discs. In high performance disc drives, servo data is written on every track at the boundary of every sector which is read by the active transducer to provide positioning information to a servo system (not shown) that is used in the positioning of the actuator.

Figure 2:
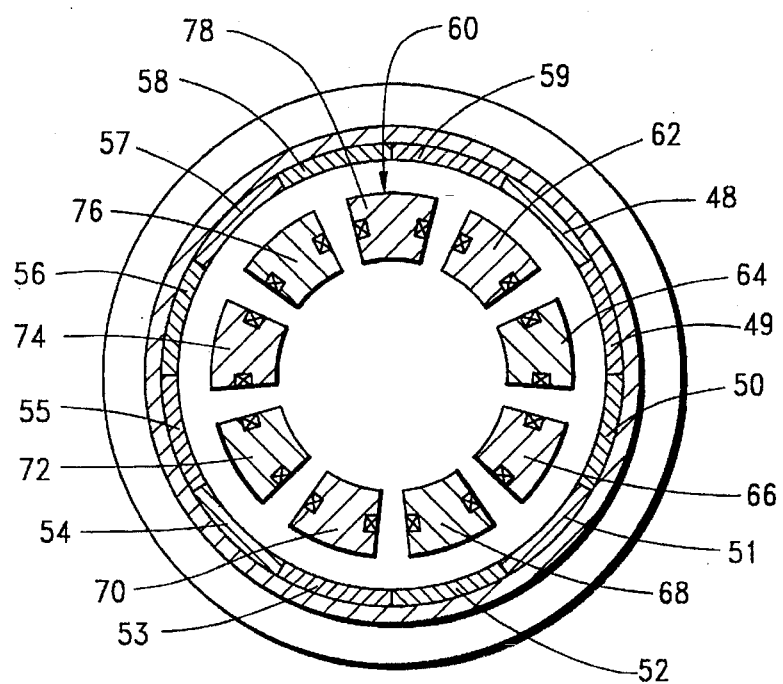
FIG. 2 is a cross section taken along line 2—2 of FIG. 1.

Support for the discs 22, 24 in the hard disc drive 20 is provided by a rotor 30 of an electrically commutated, polyphase brushless dc spindle motor 32 so that the motor 32 can be used to provide the rotation of the discs 22, 24 necessary for the writing and subsequent reading of data. As shown in FIG. 2, the rotor 30 is composed of a shell 34 (not numerically designated in FIG. 1) having a flange 36 formed at the lower end thereof so that the discs can be mounted on the rotor 32 as indicated in FIG. 1. Specifically, central holes 38 and 40, sized to slip on upper portions of the shell 34, are formed through the discs 22 and 24 respectively and the discs are supported in a spaced relation on the flange 36 by spacers, two of which have been indicated as 42 and 44, and clamped to the rotor 32 by a plate 46. The plate 46 is positioned atop the uppermost disc 22 and is provided with a plurality of holes (not numerically designated in the drawings) that align with a plurality of threaded holes (not numerically designated in the drawings) in the top of the rotor 22. The plate 46 is secured to the rotor 32 by way of bolts (not shown) that extend through the holes in the plate 46 and screw into the holes in the top of the rotor 32.

Referring to FIG. 2, the rotor is further composed of a plurality of permanent magnets 48, 49, 50, 51, 52, 53, 54, 55, 56, 57, 58 and 59 attached to the inner wall of the shell to extend in a ring about a stator 60. The stator 60 is mounted on the case, partially illustrated at 62 in FIG. 1, of the hard disc drive 20 and bearings (not shown) between the shell 34 and the stator 60. As shown in FIG. 2, the stator 60 is composed of a plurality of stator sections 62, 64, 66, 68, 70, 72, 74, 76, and 78 which carry windings 80, 82, and 84 as shown in FIG. 3.

Figure 3:
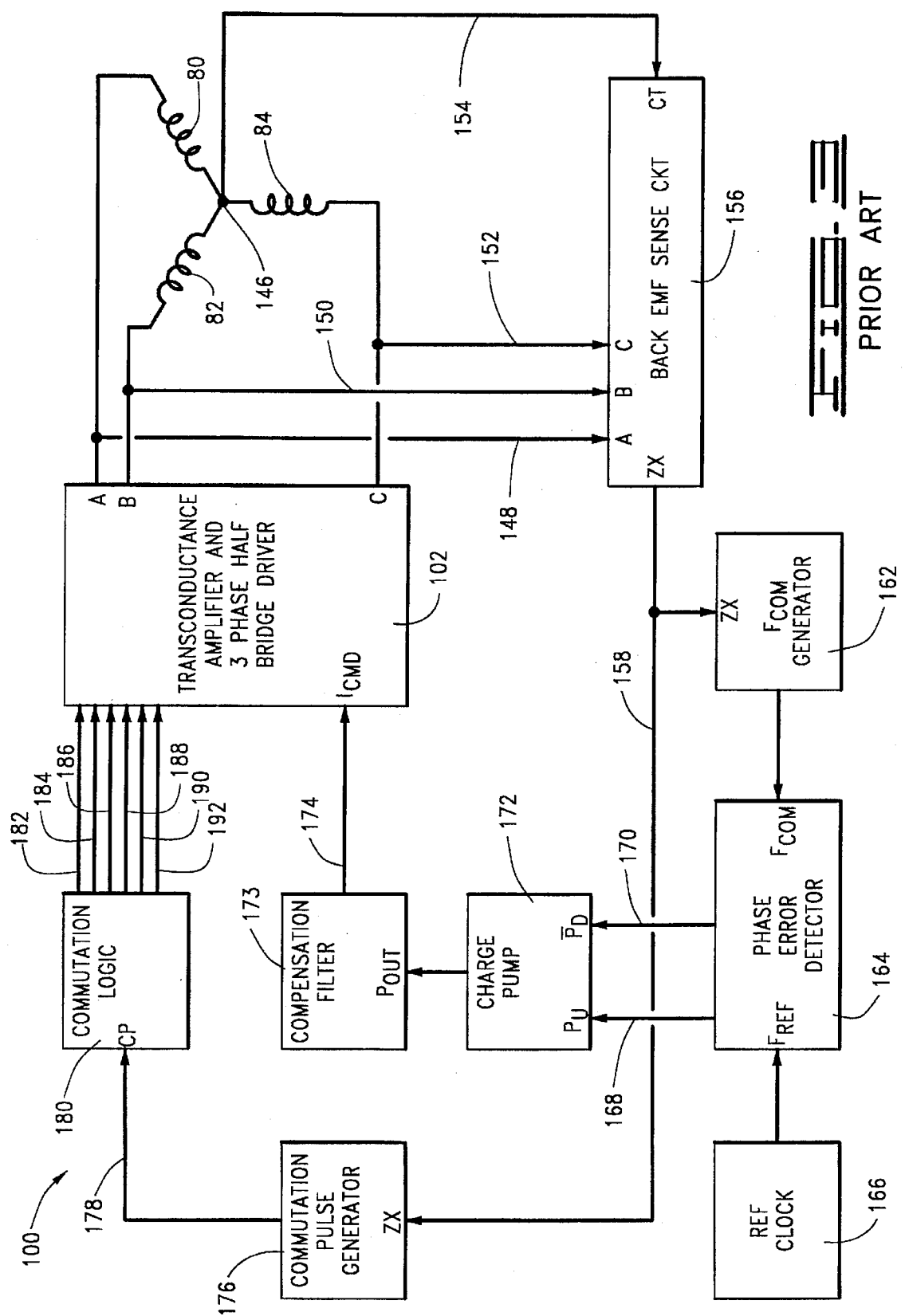
FIG. 3 is a schematic block diagram of a conventional motor circuit of the hard disc drive of FIG. 1.
Figures 4, 5:
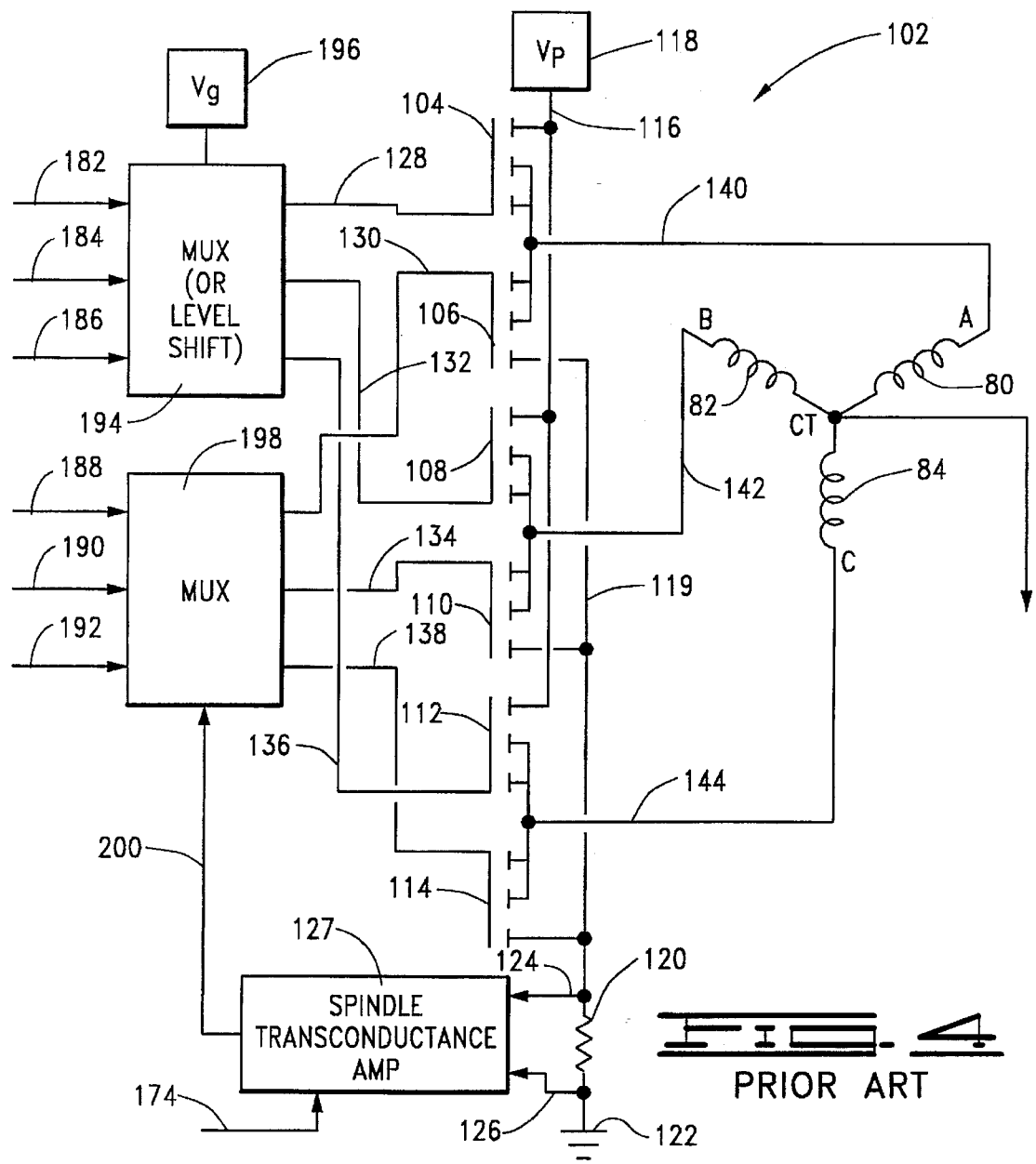
FIG. 4 is a schematic diagram of a conventional 3-phase half bridge driver of the motor circuit shown in FIG. 3.
FIG. 5 is a table of commutation steps that occur during a conventional six step commutation cycle for a conventional three phase motor.

Referring now to FIG. 3, shown therein is a motor circuit 100 that includes the windings 80, 82 and 84 and a transconductance amplifier and 3-phase half-bridge driver circuit 102 (hereinafter "driver circuit") with outputs connected to the windings 80, 82 and 84, for selectively energizing the windings. Although the construction of such driver circuits is well known, for clarity of discussion FIG. 4 shows a general schematic of the driver circuit 102 containing six FETs 104, 106, 108, 110, 112, and 114, connected in pairs in such a manner so that FETs 104 and 106 are connected to winding 80 (further designated in FIG. 4 for clarity of illustration as phase A) by way of signal path 140, FETs 108 and 110 are connected to winding 82 (designated as phase B) by way of signal path 142, and FETs 112 and 114 are connected to winding 84 (designated as phase C) by way of signal path 144. As will be recognized by those of skill in the art, additional components, such as protection diodes, may be commonly employed in such driver circuits, but these have been omitted to facilitate the present discussion.

Also shown in FIG. 4 is signal path 116, which connects a high voltage source Vp 118 to the sources of FETs 104, 108, and 112, and signal path 119, which connects the drains of FETs 106, 110, and 114 to a current sense resistor 120. The current sense resistor 120 is connected between the signal path 119 and electrical ground 122, and current sense taps 124 and 126 are connected across the current sense resistor 120 to provide a current sense to a spindle transconductance amplifier 127, the purpose of which will be more fully described below.

As can be seen in FIG. 4, the gates of the FETs 104, 106, 108, 110, 112 and 114 are accessed by way of signal paths 128, 130, 132, 134, 136, and 138, so that, for example, the impression of a voltage on signal path 128 to turn on FET 104 will cause the voltage Vp to be impressed on the phase A winding 82 by way of signal paths 116 and 140.

It is common practice during commutation of a three phase spindle motor to impress one phase with a high voltage, another phase with a low voltage (generally ground), and to leave the third phase in an unenergized, high impedance state at each commutation step, and to change these states at each subsequent commutation step so as to cause rotation of the motor in the desired direction and speed. It can be seen from FIG. 4 that, in order to impress the voltage Vp on phase A, signal path 128 may be provided with voltage sufficient to turn on FET 104, while signal path 130 should remain at a state below a level sufficient to turn on FET 106, thus causing conduction through FET 104 and allowing the voltage Vp to be impressed on phase A by establishing a conduction path from the signal path 116, through FET 104, and through the signal path 140 to phase A. Similarly, in order to provide a low voltage on phase B, it can be seen that FET 110 may be turned on by providing a sufficient voltage on signal path 134, while signal path 132 should remain at a voltage below a level sufficient to turn on FET 108. In this way, a ground path is established from phase B, through the signal path 142, the FET 110, the signal path 118, the resistor 120, and finally to ground 122. By applying sufficient voltages on signal paths 128 and 134 to turn on FETs 104 and 110, while ensuring voltages applied on the signal paths 130 and 132 keep FETs 106 and 108 turned off, current can be made to flow from phase A to phase B. It should also be readily apparent that phase C will remain at an unenergized, high impedance state simply by leaving both FETs 112 and 114 in an off state by not energizing signal paths 136 and 138.

Referring now to FIG. 5, a table is provided therein that shows the sequence of states that each phase in a three phase spindle motor might take during commutation of the motor. As can be seen, a commutation cycle for such a motor consists of six commutation steps during which each phase is held at high voltage (denoted as "HIGH" in the table), low voltage (denoted as "LOW" in the table), and high impedance (denoted as "HI-Z" in the table) twice respectively through the commutation cycle. Depending on the number of stator magnetic poles located in a spindle motor, there may be several commutation cycles within one complete mechanical revolution of the motor.

Referring again to FIG. 3, the windings 80, 82, and 84, as well as a center tap 146, are connected by way of signal paths 148, 150, 152, and 154 respectively to a conventional back emf sense circuit 156, which compares the voltages on the phases to the voltage on the center tap and outputs a zero crossing signal (ZX) on signal path 158 at such points that a zero crossing is detected, as has been previously discussed. More particularly, after each commutation step, the back emf sense circuit 156 compares the voltage induced by the back emf of the motor on the unenergized phase to the voltage on the center tap and outputs a ZX signal when the voltage on the unenergized phase changes polarity with, or "crosses over" the voltage on the center tap (hence the use of the term "zero crossing").

Figures 6, 7:
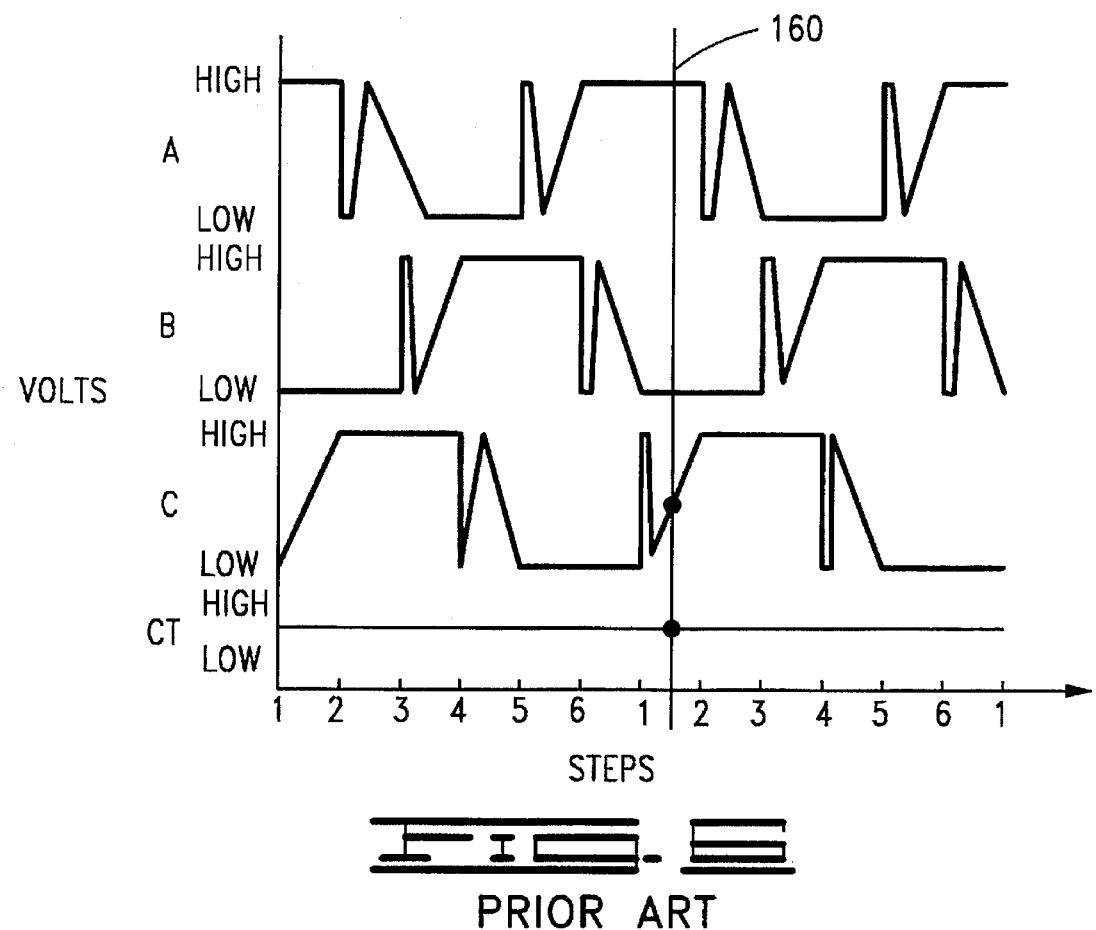
FIG. 6 is a set of graphical charts illustrating the voltage levels of the three phases and the center tap of the motor of FIG. 1 as the motor is commutated according to the commutation cycle as shown in FIG. 5.
FIG. 7 is a commutation table illustrating the operation of the conventional commutation logic circuit as shown in FIG. 3.
Figure 5:
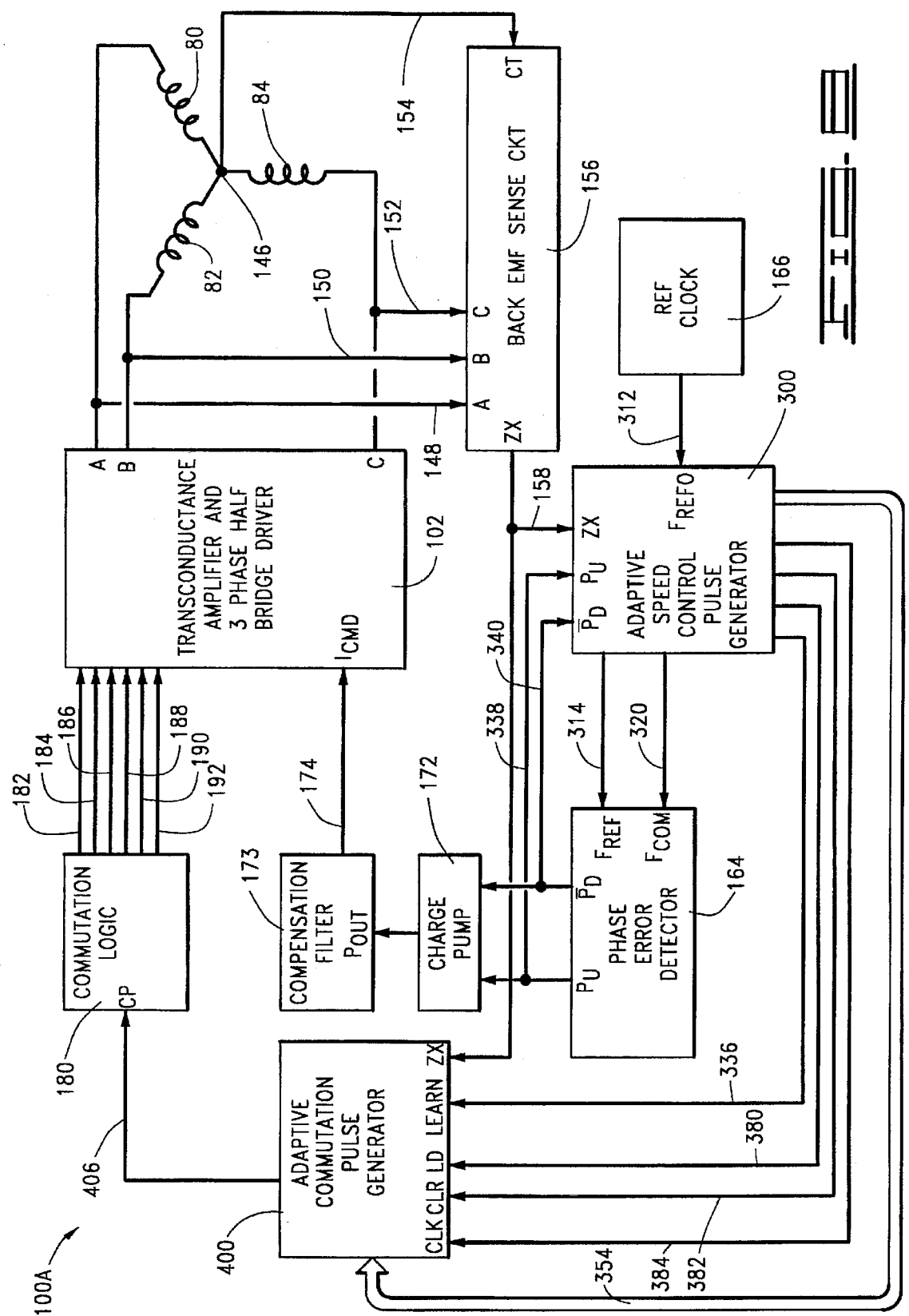
Figure 5:
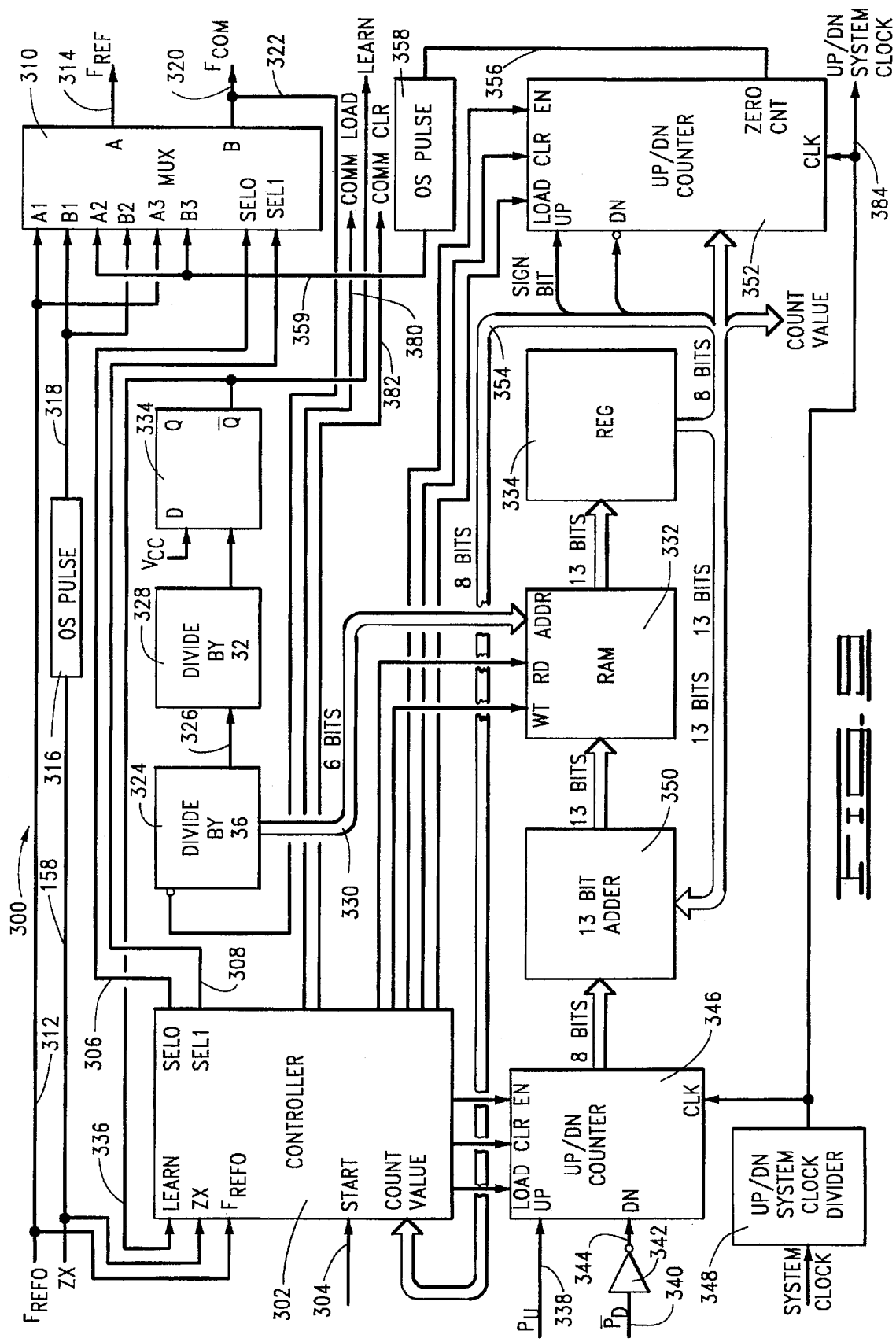

FIG. 6 shows the voltages on phases A, B, and C and the voltage on the center tap (CT) during the commutation steps described with reference to FIG. 5. As shown in FIG. 6, at each of the first commutation steps (step 1), phase A is at high voltage, phase B is at low voltage, and phase C is at high impedance. During step 1, the voltage on phase C transitions from a high impedance to a high voltage state; at a point denoted as 160 which is about halfway through step 1, the voltage on phase C crosses over the voltage at the center tap. The back emf sense circuit 156, as shown in FIG. 3, outputs a ZX signal after each commutation step at the point in time when the previously unenergized phase experiences a zero crossing with the voltage on the center tap. Thus, as the back emf sense circuit 156 monitors the voltages from the spindle motor 20 during operation of the motor at nominal operating speed, signal path 158 is provided with a series of ZX pulses that correspond to the measured zero crossings from the motor 20, with the time between successive zero crossings defining zero crossing periods.

Referring again to FIG. 3, the ZX signals are provided by way of signal path 158 to a conventional Fcom pulse generator 162 which generates Fcom pulses (for "commutation frequency") in response to the ZX signals from the back emf sense circuit 156. The Fcom pulse may occur at the same time as the ZX signal, or may be delayed with respect to the ZX signal. The Fcom pulses are provided to a conventional phase detector 164 which measures the phase difference between each Fcom pulse and a corresponding reference pulse (Fref provided by a conventional Fref clock 166.

The Fref pulses are provided at a reference frequency that corresponds to the speed of the motor running at operating speed and may be calculated by multiplying the number of phases in the motor with the number of magnetic pole pairs, or stator sections and with the operating speed of the motor, in revolutions per second. For example, for a three phase, 12 pole motor running at 5400 revolutions per minute (90 revolutions per second), the reference frequency would be selected to be Fref=(phases)(poles)(RPS)=(3)(12)(90)=3.24 KHz.

The Fref frequency will correspond to the nominal Fcom frequency, that is, the nominal frequency of the Fcom signals generated by the zero crossings from the motor running at operating speed.

The phase detector 164 thus compares the Fcom pulses with the Fref pulses and generates pump up pulses (Pu) and pump down pulses (/Pd) based on the relative timing of the Fcom and associated Fref pulses. More particularly, a Pu pulse is generated at such times that an Fcom pulse occurs after the corresponding Fref pulse, the Pu pulse having a duration equal to the phase difference between the Fcom and Fref pulses. Similarly, a /Pd pulse is generated at such times that an Fcom pulse occurs before the corresponding Fref pulse with a duration equal to the phase difference between the Fref and Fcom pulses.

The generation of a Pu pulse by the phase detector 164 is generally taken to indicate that the motor is running too slow, as an Fcom pulse from the zero crossing occurring after the corresponding Fref pulse generally indicates that the motor speed is lagging behind the Fref frequency. Similarly, a /Pd pulse is generally taken to indicate that the motor is running too fast, as an Fcom pulse occurring before the corresponding Fref pulse indicates the motor speed is leading the Fref frequency. Additionally, the duration of the Pu and /Pd pulses provide a relative indication of how slow or how fast, respectively, the motor is running. As a result, the motor circuit 100 uses the Pu and /Pd pulses to modulate the speed of the motor so that a Pu pulse results in the motor being sped up slightly while a /Pd pulse results in the motor being slowed down slightly. This will be described in more detail below.

The Pu and /Pd pulses are provided by way of signal paths 168 and 170 respectively to a conventional charge pump circuit 172. Those of skill in the art will recognize that such charge pump circuits are well known in the art and that either a voltage type or a current type charge pump may be used in such a circuit.

For reference, in a voltage type charge pump, a fixed voltage relative to a reference voltage is applied to the input of a low pass filter for the duration of the Pu or /Pd pulse. In this case, the Pu pulse voltage is normally positive with respect to a reference voltage, while the /Pd pulse voltage is negative with respect to the reference voltage. During the time when there is neither a Pu nor a /Pd pulse (or when both are present) the output of the charge pump circuit is the reference voltage.

On the other hand, in a current type charge pump a fixed current (normally programmed by a fixed resistor) is applied to a transimpedance amplifier which integrates the current pulses and provides a voltage proportional to the integral of the pump current. As with voltage type of charge pump, a positive current is output for the duration of the Pu pulse and is withdrawn for the duration of the /Pd pulse. No current is supplied or withdrawn when neither the Pu nor the /Pd pulse is present (nor when both are present).

The output Pout of the charge pump circuit 172 is provided to a compensation filter circuit 173, which includes a conventional low pass filter (not particularly shown) which filters out the sample frequencies related to the Fcom and Fref pulses. The low pass filter can be constructed from conventional passive or active elements to provide filtering of frequencies above a cutoff frequency, which is normally in the range of about 100 Hz. The output of the low pass filter is provided to a conventional lead-lag circuit (also not particularly shown) which provides the required phase margin to achieve stability in the overall phase lock loop. As is known by those of skill in the art, a frequency error approach could be used instead of a phase error approach as described hereinabove, in which case a lead-lag filter would not be required. It is important to note, however, that the present invention is not dependent upon the use of a particular approach and embodiments of the present invention are presented hereinbelow for both a phase lock and a frequency lock implementation.

The output of the compensation filter is a DC signal relative to a reference voltage representing required motor current to maintain a constant phase error, which may be zero, depending upon the type of compensation circuit used. At equilibrium, there is normally a constant voltage difference between the output voltage and the reference voltage which will include DC offsets and biases along with the required driving voltage. This output of the compensation filter is denoted as a current command (Icmd) signal and provided on signal path 174 (as shown in FIG. 3) to the driver circuit 102. More particularly, the Icmd signal is provided by way of signal path 174 to the spindle transconductance amplifier 127 previously described with reference to FIG. 4.

Referring now to the zero crossing ZX signal generated by the back emf sense circuit 156 as shown in FIG. 3, it should be noted that this signal is not only provided on signal path 158 to the Fcom pulse generator 162, as previously discussed, but the signal is also provided on signal path 158 to a conventional commutation pulse generator 176 to provide the necessary timing for subsequent commutation steps during operation of the motor circuit 100. As previously discussed, such prior art commutation pulse generators 176 use the most recent zero crossing period in order to determine when to provide the next commutation step by receiving a ZX pulse, measuring the time that elapses until the occurrence of the next ZX pulse (i.e., the zero crossing period), taking a portion of this measured time (for example, one-half of the zero crossing period), and placing the next commutation step by way of a delay counter at a point in time equal to this portion after the most recent zero crossing pulse. Some prior art circuits use an established portion of the previous zero crossing period (such as one-half the period), while others may use one-half the period plus or minus a small fixed period of time to adjust the placement of the subsequent commutation steps to improve motor torque characteristics.

Based upon the timing scheme used by the commutation pulse generator 176, a commutation pulse (CP) signal will be subsequently output on signal path 178 to a conventional commutation logic circuit 180, which operates to provide a sequenced output on six output signal paths 182, 184, 186, 188, 190, and 192, with these outputs changing for each new commutation step in response to the CP signal. The sequence of states for these outputs is shown in a table in FIG. 7, which provides the outputs from the commutation logic circuit 180 for each step in the six step commutation cycle described with reference to FIGS. 5 and 6.

In the table of FIG. 7, a "1" corresponds to a high voltage, perhaps 5 V, being placed on the indicated signal path, whereas a "0" corresponds to a low voltage, perhaps ground, being placed on the indicated signal path. As will be recognized by those of skill in the art, the commutation logic circuit 180 may be implemented using combinatorial logic or a state machine to output the sequence of states shown in FIG. at each successive commutation step. The commutation logic circuit 180 receives conventional operational commands from a system controller (not shown).

Continuing with FIG. 4, it will be readily observed that the signal paths 182, 184 and 186 are provided to a multiplexer 194 (hereinafter "mux"). The mux 194 serves to switch a voltage Vg from a voltage source 196 to one of the three previously described signal paths 128, 132, and 136 in response to the signals provided on signal paths 182, 184, and 186. For example, with reference to FIG. 7, it can be seen that at commutation step 1, signal path 182 is at a "1" logic state and signal paths 184 and 186 are at a "0" logic state. Thus, signal path 182 will be provided with a high voltage (perhaps 5 V), which will cause the mux 194 to provide the voltage Vg on signal path 128, turning on FET 104 as previously described, and signal paths 132 and 136 will remain at zero volts. The value of the voltage Vg will be great enough to cause saturation of the FETs 104, 108, and 112, respectively, to allow a maximum amount of current to pass therethrough and to the energized winding 80, 82, or 84, respectively.

In a similar manner, the signal paths 188, 190 and 192 from the commutation logic circuit 180 are provided to a second multiplexer 198 which selectively applies a voltage to the corresponding signal paths 130, 134 and 138. However, the voltage applied to signal paths 130, 134 and 138, respectively is not a fixed voltage (as with mux 194), but rather varies in accordance with the detected speed of the motor. The voltage is provided on signal path 200, which is the output of the previously described spindle transconductance amplifier 127.

The spindle transconductance amplifier 127 provides a speed control feed-back loop for the motor circuit 100 by comparing the voltage across the current sense resistor 120 with the current command Icmd from the charge pump and compensation filter circuit 174, as shown in FIG. 3 and modulating the voltage provided on signal path 200 in response thereto. Unlike the voltage Vg provided by the voltage source 196 to the mux 194, the voltage applied to signal path 200 is not sufficient to cause saturation of the FETs 106, 110 and 114, but instead causes each FET when selected to operate in its linear region.

Generally, if the circuitry indicates the motor is running too fast, the spindle transconductance amplifier 127 will provide a lower voltage on signal path 200, whereas a higher voltage will be provided on signal path 200 if the motor is running too slow. Varying the voltage in this manner will regulate the current that passes through a selected source-path FET (106, 110 or 114 respectively) and thus regulate the amount of current that flows through the windings. If the motor is running too slow, slightly more current will be allowed to flow to increase the motor speed; if the motor is running too fast, slightly less current will flow to decrease the motor speed. The current will be sensed through the current resistor 120 and the voltage provided on signal path 200 may be increased or decreased according to the current command Icmd signal from the charge pump and compensation filter circuit 172.

DETAILED DESCRIPTION OF THE PREFERRED EMBODIMENT

Having now reviewed the prior art in detail, the preferred embodiments of present invention can now be described beginning with FIG. 8, which shows a block diagram for a motor circuit 100A of the present invention having a phase lock implementation. A comparison between FIG. 8 and previously discussed FIG. 3 reveals that several elements are common between the prior art motor circuit 100 shown in FIG. 3 and the motor circuit 100A shown in FIG. 8. More particularly, the motor circuit 100A of FIG. 8 comprises a driver circuit 102 having the same construction and operation as the driver circuit 102 shown in FIG. 3; the same is also generally true for the windings 80, 82, and 84, the back emf sense circuit 156, phase error detector 164, reference clock 166, charge pump 172, compensation filter 173, and the commutation logic 180 shown in FIG. 8. Additionally, however, FIG. 8 includes an adaptive speed control pulse generator circuit 300 and an adaptive commutation pulse generator circuit 400, the construction and operation of each to be described below.

Beginning with the adaptive speed control pulse generator 300, it can be seen in FIG. 8 that this circuit provides both the Fref and Fcom pulses to the conventional phase error detector 164 and in turn, receives the Pu and /Pd signals from that circuit as well as the ZX signal from the back EMF sense circuit 156 and a reference frequency (denoted as Fref0) from the reference clock 166. For reference, the Fref0 signal is the same as the Fref signal described with reference to FIG. 3, but as will become apparent below, the present invention provides the reference frequency to the adaptive speed control pulse generator 300, and not to the phase error detector 164 directly (as in the prior art), and this change in operation necessitates a change in nomenclature for the initial signal from the reference clock 166.

As provided hereinabove, the purpose of the adaptive speed control pulse generator 300 is to first characterize the systematic variations in speed during motor rotation and then to compensate for these variations during subsequent operation of the motor speed control circuitry. It is important to note at this time that there are alternative embodiments for this circuit provided within this disclosure, and each of these will be described in detail as follows.

Turning now to FIG. 9, shown therein is the first embodiment for the adaptive speed control pulse generator 300 of FIG. 8, which provides a first phase locked Fcom period compensation implementation. As will be recognized by those of skill in the art, in a phase locked loop, an error or control signal is developed by comparing the time of occurrence of a reference edge of a feedback signal, in this case the Fcom pulse, to the time of occurrence of the reference edge of a reference frequency signal. The difference between these two times is the phase error. The loop will generally try to keep the difference between the times of occurrence equal to zero or some equilibrium constant value or phase angle, depending upon the characteristics of the loop.

In the present embodiment, after the spindle motor has come up to speed and has become phase locked to a reference frequency, the circuit enters a characterization (or LEARN mode) during which a measurement is made of the pulse widths of the normal Pu (pump up) and /Pd (pump down) pulses coming out of the phase error detector 164 (as shown in FIG. 8) for each Fcom period. These pulse widths are averaged and stored in a RAM memory where each address contains the value associated with a specific Fcom period in the physical rotation of the motor. Although any number of methods may be employed to accumulate and store this information, it is not required that the addresses be tied to a specific rotational position permanently, as long as they remain so for the duration of time that the drive spindle motor remains running in phase lock. If so desired, each time that the motor starts, a new set of measurements and averaging may be initiated and each set may be independent of any previous set of measurements. This is the implementation used in the preferred embodiments of the present disclosure, but should not be construed as a limitation. After the characterization, or LEARN mode is completed, the average values obtained therefrom are used to advance or delay the Fcom or the Fref pulses as required to provide the speed control compensation.

The Pu and /Pd pulse widths represent a misplacement of the Fcom pulse with respect to a reference frequency pulse edge, whether because of the mechanical tolerances in the placement of the magnetic poles and coil slots, or because of speed errors. The average of the set of pulse widths associated with a specific Fcom represents the mechanical misplacement that is to be removed by compensation, thus providing a more uniform signal to the motor speed control that more nearly represents true speed variation.

The characterization, or LEARN mode is defined as a given number of complete revolutions of the spindle motor. The once around time is determined by counting the number of Fcom pulses; as described hereinabove, in a 12 pole, 3 phase motor there will be 36 Fcom pulses per revolution and for an 8 pole, 3 phase motor there will be 24 such pulses. For reference, the preferred embodiments of the present disclosure are based on a 12 pole, 3 phase motor resulting in 36 Fcom pulses per revolution.

As will be recognized, the process of determining the average values to be used in the compensation mode can be greatly simplified if the number of revolutions used in the determination of the average is equal to a power of 2 (such as 16 or 32). This is because the average value of a set of binary numbers is equal to the sum of the set of numbers right shifted by the number of bits equal to the power of two used to define the set of numbers. For example, the average of 32 binary values can be determined by summing the 32 values to obtain a total sum value and then right shifting the total sum value five bit locations. For reference, the preferred embodiments of the present disclosure use this methodology to average each characterization value over 32 rotations of the motor; of course, the present invention is not limited to either this number of rotations or this particular methodology for obtaining the average.

Referring again to FIG. 9, shown therein is the first embodiment of the adaptive speed control pulse generator 300 which operates generally in accordance with the foregoing description. More particularly, the circuit comprises a controller 302, which may be any variety of well known state machines, microprocessors or microcontrollers capable of carrying out the sequence described below. The controller 302 initiates the LEARN mode upon receipt of a START command on signal line 304 from the system controller (not shown). The controller 302 in turn sets a SEL0 output and a SEL1 output on select lines 306 and 308, respectively, in order to instruct a conventional six-input, two output multiplexer 310 (hereinafter "mux") to connect input A1 to output A and to connect input B1 to output B (more will be said below concerning the SEL0 and SEL1 outputs). This results in the Fref0 signal from the reference clock 166 (as shown in FIG. 8) on signal line 312 being output to output signal line 314, which in turn is provided to the phase error detector 164 of FIG. 8 as the Fref signal. As shown in FIG. 9, the ZX (zero crossing) signal from the back EMF sense circuit 156 (of FIG. 8) is provided on signal line 158 to a one-shot 316, which provides a resulting pulse on signal line 318 to inputs B1 and B2 of the mux 310, and this resulting pulse is connected to mux output signal line 320, providing the Fcom signal to the phase error detector 164 (of FIG. 8).

The pulse on mux output signal line 320 is also provided by way of signal line 322 to a divide by 36 divider 324. An inverting input is shown to indicate that the pulse is inverted prior to receipt by the divider 324. The divider 324 proceeds to output an output pulse on signal line 326 to a divide by 32 divider 328 after the receipt of 36 input pulses from signal line 322, providing an indication each time one complete revolution of the motor has occurred. Additionally, the divider 324, at the receipt of each input pulse from signal line 322, outputs a six bit value on bus 330, which serves as a unique address input for a RAM 332, the function of which to be described below. The divider 328, in turn, outputs a signal at the completion of 32 revolutions to a D-latch 334, which sets the latch and toggles the LEARN value reported to the controller by way of signal path 336, indicating that the LEARN mode has been completed. To provide clarity of illustration, FIG. 8 omits certain conventional clear and clock lines that, as will be recognized, would be required for these and other circuit blocks shown. It is sufficient to note that the circuit is cleared upon initialization in a conventional manner and that the completion of the 32 rotations of the motor during the LEARN mode is reported to the controller 302 by way of the signal line 336.

Now, as will be recalled, the phase detector 164 of FIG. 8 generates, in response to the phase difference between the Fref and Fcom signals, Pu and /Pd pulses, and as shown in FIG. 8, these signals are provided by way of signal paths 338 and 340, respectively, to the charge pump and compensation filter circuit 172 as well as the adaptive speed control pulse generator 300. More particularly, FIG. 9 shows these signal paths 338 and 340 coming into the circuit, with the signal path 340 (containing the /Pd pulse) being connected to an inverter 342 so that the Pu pulse is provided on path 338 and an inverted/Pd pulse is provided on signal path 344 to an up/down counter 346.

The up/down counter 346 is a conventional counter that provides an eight bit count (in two's complement form) from an initial zero value in accordance with the signals applied to UP and DN inputs. The counter counts up while the Pu pulse is active and counts down while the inverted/Pd pulse is active, causing either a positive or a negative count, respectively. The counter 346 is initialized and cleared by the controller 302 for each count and the clock for the counter 346 is supplied at some division of the system clock that provides the resolution desired (provided by up/down system clock divider 348). Of course, the actual frequency used would be dependent upon the design. The resulting count is an eight bit count value that represents the duration of the incoming Pu or inverted/Pd pulse, respectively.

The eight bit count value is provided to a 13 bit adder 350 and added to a previous value stored in RAM 332 for that Fcom period (the previous value being provided by way of a register 334). It should be noted that, upon system initialization, the RAM is initialized by the controller 302 so that zeros are initially stored in all 36 required memory locations (there being 36 Fcom periods in a motor revolution). The eight bit count is provided as the least significant bits to the 13 bit adder 350, and over the course of the LEARN mode, as the motor makes 32 revolutions, a total sum is accumulated for each Fcom period. Of course, some values will be positive and others will be negative, depending upon the receipt of Pu and /Pd pulses respectively during the operation of the phase error detector 164 of FIG. 8, but at the conclusion of the LEARN mode, the RAM 332 will contain 36 different total sums, each having a total of 13 bits and each further corresponding to each Fcom period in a motor rotation.

Upon completion of the LEARN mode, as described hereinabove, the circuit 300 will enter a compensation mode of operation. For each Fcom period, the RAM 332 is instructed to provide the total sum to the register 334, and the eight most significant bits of the total sum is provided to an up/down counter 352. As described hereinabove, using the eight most significant bits of the 13 bit total sum effectuates a divide by 32 operation (by shifting the value right by five bit locations), so that the resulting value placed into the up/down counter 352 is an average value for that Fcom period. It will be readily recognized that the two up/down counters 346, 352 are not both required; rather, a single up/down counter could be used for both the characterization and compensation mode of operation with appropriate selection logic, but to provide a more clear description of the operation of the circuit, two counters have been provided.

As hereinabove described, the count value from the register 334 is in two's complement form, which includes a sign bit for indicating the polarity of the count, the sign bit having a value of "1" if the count is negative and "0" if the count is positive. As shown in FIG. 9, bus 354 connects the eight bit count from the register 334 to the up/down counter 352 and the controller 302. Additionally, the sign bit is connected to an UP input of the up/down counter 352 and an inverted sign bit is connected to the DN input of the up/down counter 352. In this way, the polarity of the sign bit instructs the counter 352, once enabled, to either count up from the initially loaded count value to zero (if the value is negative) or to count down from the count value to zero (if positive). The controller tests the count value to see if it is zero, positive or negative, and provides outputs on the aforementioned SEL0 and SEL1 signal paths 306 and 308 as well as instructions to the up/down counter 352 accordingly.

If the count value is equal to zero, then the counter 352 is not enabled by the controller 302 and the SEL0 and SEL1 outputs are set to select the A1 and B1 inputs on the mux 310 (the same as during the LEARN mode). This passes the incoming Fref0 and ZX signals directly to the phase error detector 164 without compensation.

If the count value is a positive number, the controller 302 enables the counter 352 to count down from the count value to zero at the occurrence of the next Fref0 pulse sensed on signal path 312 and the counter 352, once the zero count is reached, outputs a zero count signal on signal path 356 which is provided to a one-shot 358. The output of the one-shot 358 is a pulse that is provided by way of signal path 359 to both the A2 and the B3 inputs of the mux 310. At same time that the counter 352 is enabled to begin the countdown, the controller 302 also provides the appropriate signals on the SEL0 and SEL1 signal paths 306 and 308 so as to instruct the mux 310 to select the inputs A2 and B1. Thus, the circuit 300 provides a "delayed" Fref signal on signal path 314 and a "normal" Fcom signal on signal path 320 to the phase error detector 164 of FIG. 8.

Finally, if the count value is a negative number, the controller 302 enables the counter 352 to count up from the count value to zero at the occurrence of the next ZX signal from signal path 158. In response, the counter 352 counts up to zero and outputs a pulse which is subsequently applied to the A2 and B3 inputs of the mux 310. This time, however, the controller 302 selects the SEL0 and SEL1 values so as to instruct the mux 310 to pass inputs A1 and B3, so in the case of a negative count value, the net result is the passage of a "normal" Fref signal on signal path 314 and a "delayed" Fcom signal on signal path 320 to the phase error detector 164.

It should be noted that this implementation results in a non-uniform reference frequency being provided to the phase error detector (as well as delayed Fcom pulses with respect to the detection of zero crossings by the back EMF sense circuit), but the benefit is a decrease in motor speed variations and improved speed control operation in the compensation mode. It should further be noted that the entire circuit of FIG. 8 could be implemented in a microprocessor or a DSP with suitable programming to accomplish the functions hereinabove described.

It was mentioned hereinabove that the adaptive speed control pulse generator of FIG. 8 could be embodied in several alternative ways, and having completed a description of the first embodiment with respect to FIG. 9, the discussion will now turn to a second embodiment of the circuit and FIG. 10 has been provided for that purpose.

FIG. 10 presents a second phase locked Fcom period compensation implementation, which also develops a control signal by comparing the Fcom pulse with the Fref pulse and keeping the phase difference at some constant value, but in this second embodiment the reference frequency provided to the phase error detector 164 (of FIG. 8) remains constant and the Fcom signal is advanced or delayed as required.

The adaptive speed control pulse generator of FIG. 10 is generally denoted as item 300A, and includes several of the same components as the circuit of FIG. 9. The operation of the circuit of FIG. 10 is essentially the same as that of the circuit of FIG. 9 during the LEARN mode; over the course of the 32 mechanical revolutions that comprise the LEARN mode, a total sum is stored in the RAM 332 for each Fcom period. Additionally, the controller 302 provides a SEL output on select line 360, instructing the mux 310 to connect inputs A1 and B1 to outputs A and B, passing the Fref0 signal from the reference generator 166 (as shown in FIG. 8) and the Fcom signal (ZX signal by way of the one-shot 316) to the phase error detector 164 of FIG. 8. It is important to note that the polarity of the count values calculated during the LEARN mode by the circuit of FIG. 10 are reversed in comparison with the values calculated by the circuit of FIG. 9; more particularly, in FIG. 10 the Pu signal path 338 is connected to the DN input of the counter 346 and the signal path 344 containing the inverted /Pd pulse is connected to the UP input of the counter 346.

Once the LEARN mode is completed, the circuit enters the compensation mode during which, for each Fcom period, the most significant eight bits from the RAM are provided to an adder 362 which also receives a constant value indicative of ½ of the Fref period from block 364. These two values are summed so that the count value from RAM 332 is either added to or subtracted from ½ of the Fref period (depending upon whether the count value is positive or negative) and this value is loaded into the up/down counter 352 which is enabled by the controller 302 at the occurrence of the next ZX pulse. When the counter reaches zero, a zero count pulse is provided on the signal path 356 to the one-shot 358 and the resulting pulse is thereafter applied by way of signal path 359 to the B2 input of the mux 310. At the same time, the controller 302 provides the appropriate SEL signal on selection line 360 to connect inputs A2 and B2 of the mux 310 to outputs A and B so that the Fref signal is placed on output line 314 and the Fcom signal is placed on signal line 320. FIG. 10 shows an inverter 366 upline from the mux input A2 so that the Fref signal supplied to the phase error detector 164 during the compensation mode is inverted with respect to the Fref signal provided during the LEARN mode. The phase reversal of the Fref signal is made to account for the nearly 180 degree phase delay of the compensated Fcom signal.

To summarize, the operation of the second embodiment for the adaptive speed control pulse generator 300A shown in FIG. 10 provides a constant reference frequency to the phase error detector 164 (of FIG. 8) and advances or delays the Fcom signal accordingly to provide improved motor speed variation control.

Figure 11:
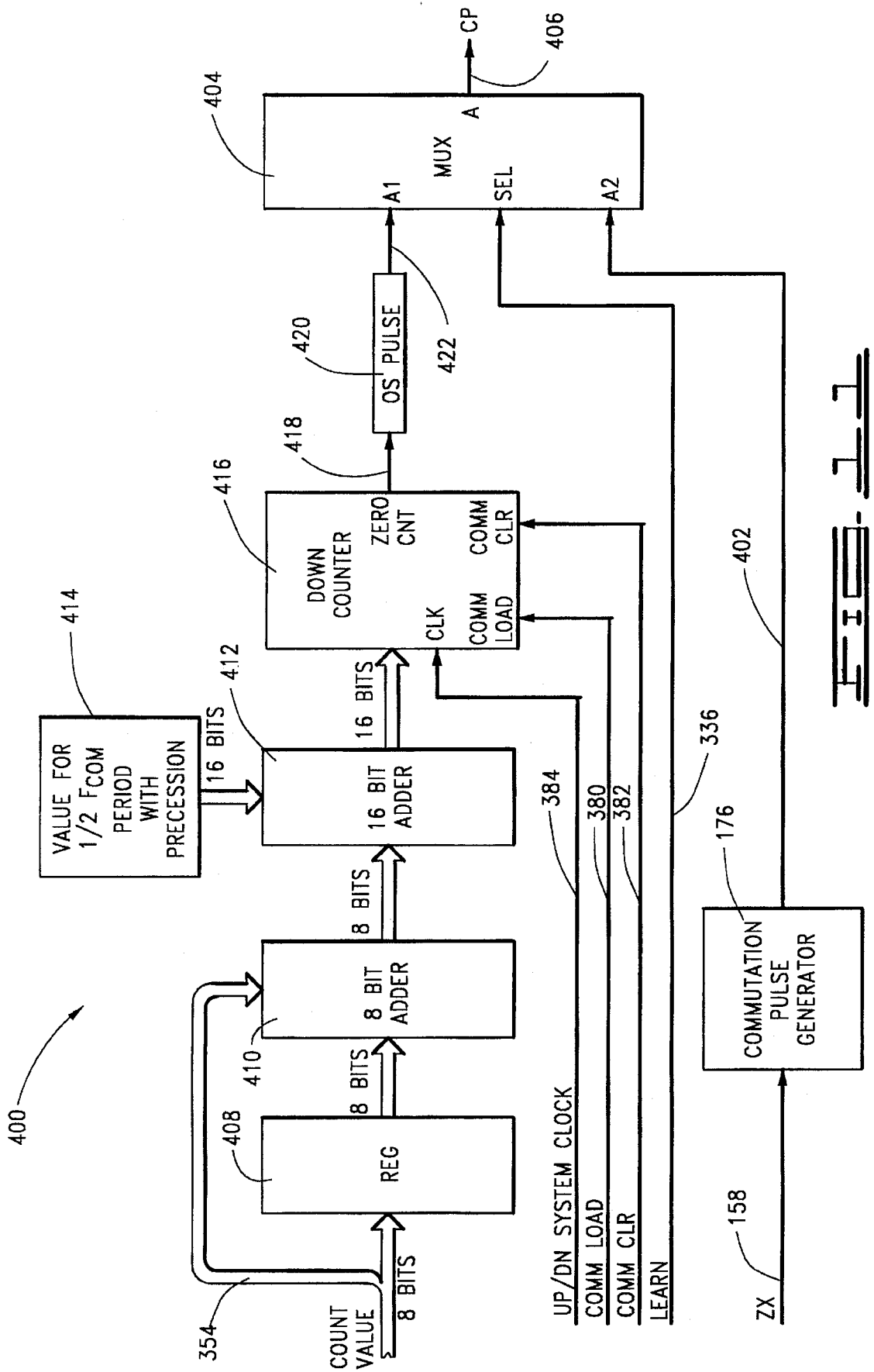
FIG. 11 is a schematic block diagram of the preferred embodiment of the adaptive commutation pulse generator of FIG. 8.

Referring again to FIG. 8, the preferred embodiment of the present invention presented therein includes the aforementioned adaptive commutation pulse generator circuit 400, which receives the ZX signal from the back EMF sense circuit 156 as well as several signals from the adaptive speed control pulse generator 300. FIG. 11 shows an embodiment for the adaptive commutation pulse generator 400, which is a phase lock commutation compensation circuit that works in cooperation with either the phase lock Fcom period compensation circuit of FIG. 9 or FIG. 10 to improve the commutation timing of the motor.

Generally, the adaptive commutation pulse generator circuit 400 uses the two Fcom average error values that bound the commutation point to determine the specific timing of the commutation point. As described hereinabove, prior art commutation methods generally place the commutation point at a location in time that is one-half of the length of the previous Fcom period beyond the most recently occurring Fcom pulse. The present circuit, however, adaptively places the commutation point at the halfway point of the current Fcom period. With an ideal motor, the commutation point should optimally occur at a target point which is the half period point of the reference frequency, plus or minus a precession value that is introduced as desired to optimize motor torque performance. The present circuit places the compensated commutation point at a point that is the target point plus one-half the sum of the average Fcom error for the Fcom pulses that bound the point.

Turning to FIG. 11, the adaptive commutation pulse generator 400 receives the ZX pulse on signal path 158 from the back EMF sense circuit 156 (of FIG. 8), as well as the eight bit count value (on bus 354), the LEARN signal (path 336), a commutation load signal (path 380), a commutation clear signal (path 382) and an up/down system clock signal (path 384) from the adaptive speed control pulse generator (300 in FIG. 9 or 300A in FIG. 10).

During the LEARN mode, the adaptive commutation pulse generator 400 operates to provide commutation timing for the motor using the conventional commutation pulse generator 176, which operates to output conventional commutation timing pulses on signal path 402 in response to the receipt of successive ZX pulses on path 158. The prior art commutation pulse generator 176 was discussed hereinabove with reference to FIG. 3 and may be implemented using a controller or combinatorial timing logic as required to generate the necessary pulses. For purposes of clarity, FIG. 12 provides a simple flow chaff that illustrates the general steps that may be performed by this circuit to generate each conventional commutation timing pulse. Of course, it will be recognized that the steps illustrated in FIG. 12 are performed for every Fcom period during operation of the circuit so that a count is initialized upon receipt of every ZX pulse.

Turning again to FIG. 11, the conventional commutation timing pulses are provided on the signal path 402 to a multiplexer 404, which also receives the LEARN signal from signal path 336 as a selection input. During the LEARN mode, the mux 404 thus outputs the commutation timing pulses CP from the commutation pulse generator 176 on output line 406 to the commutation logic circuit 180 of FIG. 8, which operates in accordance with the foregoing description to provide the commutation timing of the motor.

Upon completion of the LEARN mode, the circuit of FIG. 11 enters the compensation mode, during which the commutation timing is adaptively improved. More particularly, the eight bit count value from the register 334, as shown in FIGS. 9 and 10, is provided by way of the bus 354 to a register 408 and also to an eight bit adder 410 in a manner to be described below. The purpose of the register 408 is to delay the received count value one Fcom period, with the register being controlled in a conventional manner by the controller 302 of FIG. 8 (details not shown for purposes of clarity). Thus, the adder 410 receives a count value from the present period as well as the count value from the immediately preceding period, performs a summing operation on these two values, and provides an eight bit sum output to a 16 bit adder 412.

The adder 412 is also provided with a constant 16 bit value from block 414, this value representing one-half of the nominal (ideal) Fcom period (plus or minus any precession value that may be used to slightly advance or delay the commutation timing to improve the torque characteristics of the motor). The least significant bit (LSB) of the eight bit sum output from the adder 410 is discarded by the adder 412 (to effectuate a divide by 2) and this value is added to the value from block 414. It is important to note that, because the eight bit sum output from the adder 410 can be a negative number, the sign bit must be extended appropriately by the adder 412 to ensure the summing operation occurs properly.

The resulting output of the adder 412 is a 16 bit positive number that represents the optimum commutation timing for the current commutation pulse (beyond the most recently obtained ZX pulse).

The output from the adder 412 is provided to a down counter 416, which is instructed to begin counting down to zero by the controller 302 (of either FIG. 9 or FIG. 10). When the counter 416 reaches a zero count, a zero count signal is provided on signal path 418 to a one-shot 420, which outputs the commutation pulse on signal path 422 to the A1 input of the mux 404. As the circuit at this time is operating in the compensation mode, the LEARN signal has been previously toggled (by the circuit of either FIG. 9 or FIG. 10), so that the mux 404 connects the input A1 to the output A, passing the compensated commutation pulse by way of output signal path 406 to the commutation logic circuit 180 of FIG. 8 at the required point in time.

Figure 13:
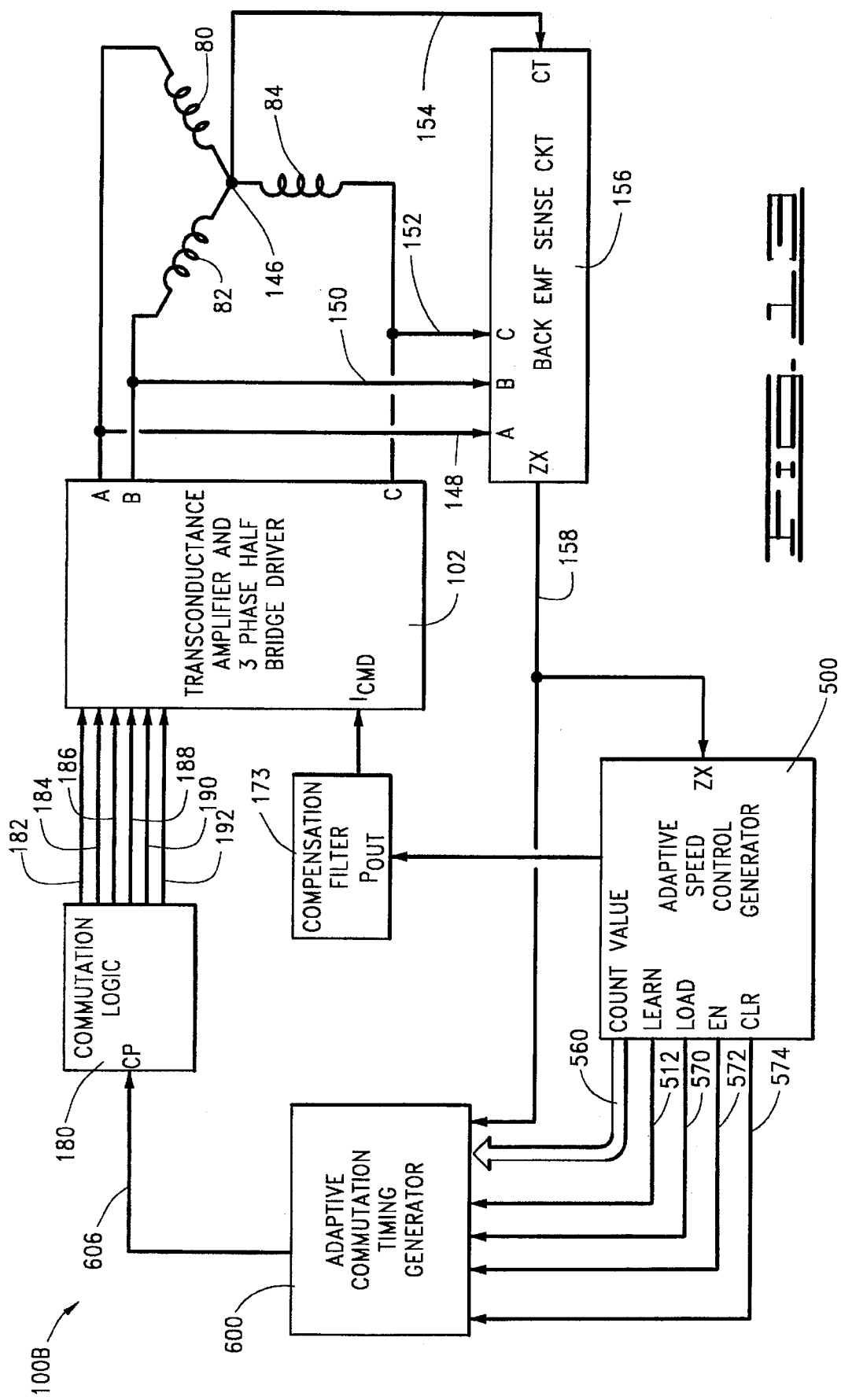
FIG. 13 is a schematic block diagram showing the preferred embodiment of the present invention using a frequency lock implementation to provide spindle motor commutation timing and speed control.

Having completed a discussion of the phase lock implementation of the motor circuit 100A shown in FIGS. 8–12, a frequency lock implementation of the present invention will now be discussed. Referring now to FIG. 13, shown therein is a motor circuit 100B comprising another preferred embodiment of the present invention and employing a frequency lock approach in controlling the speed and commutation of the motor. As with the embodiment discussed with reference to FIG. 8, the motor circuit 100B of FIG. 13 includes several prior art components that operate essentially in the same manner as described hereinabove. The new components for the motor circuit 100B shown in FIG. 13, however, are an adaptive speed control generator 500 and an adaptive commutation timing generator 600 and the construction and operation of each of these circuits will be discussed in detail below.

Figure 14:
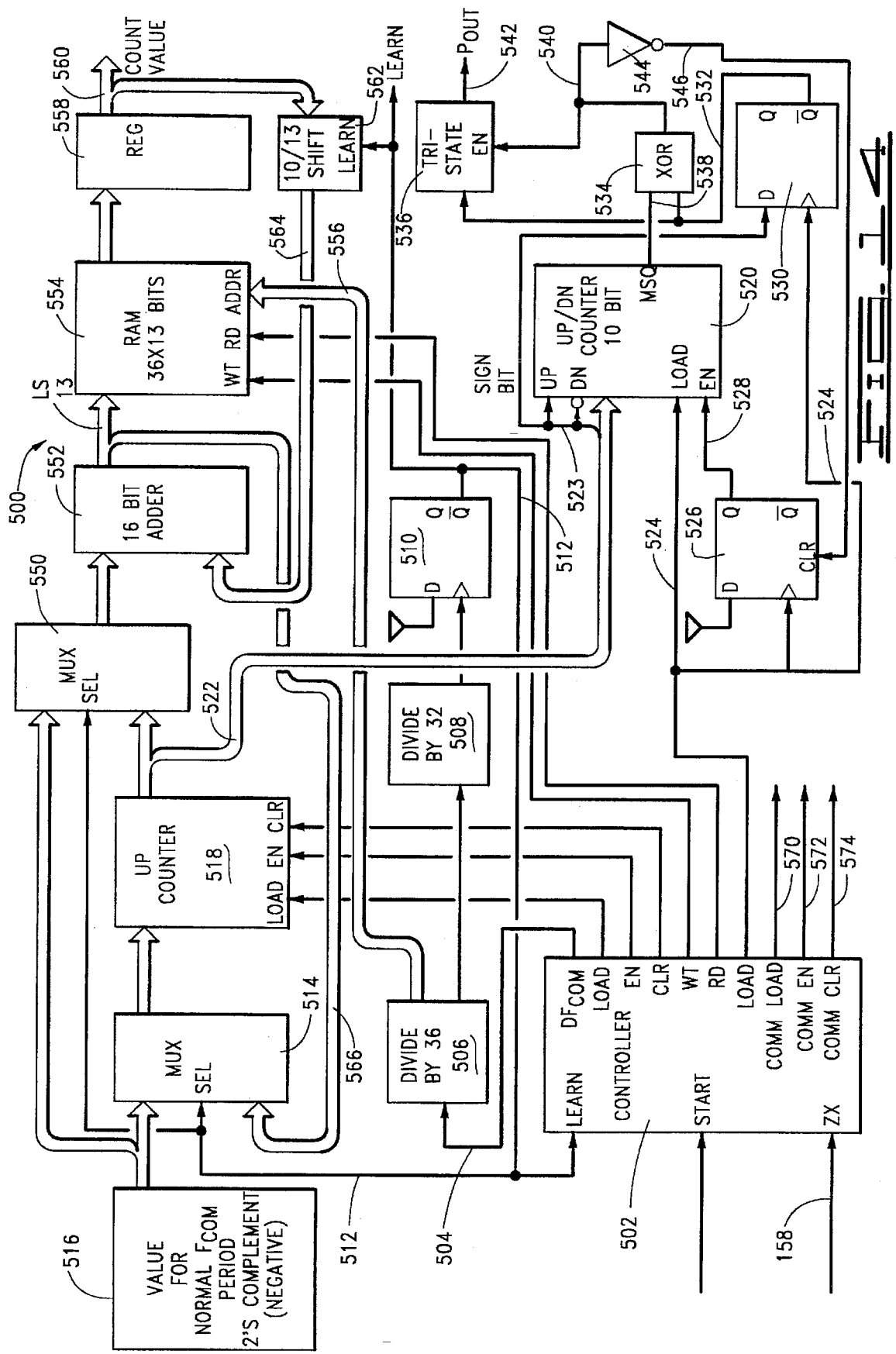
FIG. 14 is a schematic block diagram showing the preferred embodiment of the adaptive speed control generator of FIG. 13.

Beginning with the adaptive speed control generator 500, FIG. 14 shows a preferred embodiment for this circuit. It should be noted at this time that the circuit includes the operation of the charge pump 172 shown in FIG. 3, so that the output from this circuit includes the Pout signal which is provided directly to the compensation filter 173 of FIG. 13. As will be recognized by those of skill in the art, a loop system having a frequency lock implementation generally develops an error or control signal by comparing the period of a feedback signal, in this case the Fcom pulse to the period of a reference frequency. The reference frequency need not be generated as the period of the reference frequency can be represented by a constant value. The difference between the two periods is the frequency error and the servo loop will generally try to keep the frequency error equal to zero or at some equilibrium constant value or frequency slip, depending upon the characteristics of the loop.

In accordance with the present invention, after the spindle motor has come up to speed and has become frequency locked to a reference period, a measurement is made of the period error for each Fcom period. These period errors are averaged and stored in a RAM where each address contains the value associated with a specific Fcom period in the physical rotation of the motor. As with the phase lock implementation described hereinabove, it is not necessary that these addresses be tied to a specific position, but rather only that they remain so for the duration of time in which the spindle remains running. Each time that the motor starts, a new set of measurements and averaging is initiated and each set is independent of previous sets of measurements.

The period error represents a misplacement of the Fcom pulse with respect to a reference period, whether because of the mechanical tolerances in the placement of the magnetic poles and coil slots, or because of speed errors. The average of the set of period errors associated with a Fcom represents the mechanical misplacement that is to be removed by compensation, thus providing a more uniform signal to the motor speed control that more nearly represents true speed variation. After the characterization (LEARN) mode is completed, the average values are used to add to or subtract from each observed Fcom period to generate an improved Pout signal used by the compensation filter circuitry.

As shown below, a controller is provided to provide the sequential timing of the various components within the circuit, and the operation of this controller could be provided by way of a processor, state machine, or combinatorial logic as required. Further, the entire circuitry presented herein could be implemented directly in a DSP or other processor programmed with suitable programming to implement the functions as described.

Turning now to the circuit of FIG. 14, shown therein is the adaptive speed control generator 500, which is shown to comprise a controller 502 which receives a start command from a system controller (not shown) and, in response thereto, initiates the sequence of the present invention. As with the descriptions for the circuits of FIGS. 8–12, it will be understood that several conventional and well known operational connections are omitted from FIG. 14 to promote clarity of illustration of the operations that are explicitly set forth; it should be understood that the controller adequately controls the circuit of FIG. 14 and initiates a clear operation on the circuits prior to beginning the sequence.

Generally, the circuit of FIG. 14 operates in a manner such that the Fcom period is compared to a fixed value representing the nominal Fcom period for the running speed of the motor. If the count is too short then the motor is running too fast; conversely, if the count is too long, the motor is running too slowly. During the LEARN mode, the negative value of the nominal Fcom period is loaded into an UP counter, which commences counting the negative value up to zero. Upon receipt of the next ZX pulse, the value in the counter is transferred to an up/down counter (and the up counter is reloaded for the next measurement). The sign bit is used to determine the count direction for the up/down counter and while the up/down counter is counting a Pout signal is output, having the polarity of the sign of the loaded value. The Pout signal remains active until the counter reaches a count of zero. After the LEARN mode is completed, the circuit enters a compensation mode of operation during which the average counts accumulated during the LEARN mode are used in the generation of the Pout signals.

Now turning to a detailed description of the circuit of FIG. 14, upon receipt of the start command from the system processor, the circuit enters the aforementioned LEARN mode which continues for 32 revolutions of the spindle motor. A delayed Fcom (DFcom) signal is generated by the controller in response to the receipt of a ZX pulse from signal path 158 and output on signal path 504 to a divide by 36 divider 506, which outputs a signal every 36 DFcom signals. This output, which signifies one mechanical revolution of the motor has been completed, is provided to a divide by 32 divider 508, which at the completion of 32 revolutions latches a D-latch 510 causing the toggling of a LEARN signal on output line 512 (indicating the completion of the LEARN mode).

Output line 512 is provided as an input to the controller 502, as well as to a select input on a multiplexer 514 which causes a value from block 516 to be loaded into an up counter 518. The value in block 516 is a constant 16 bit value (in two's complement form) representative of the nominal Fcom period and is negative in sign. The value chosen, of course, is selected based upon the system clock frequency as well as the nominal rotational speed of the motor and the number of Fcom periods in a revolution (which for this example is 36). The value may be further adjusted slightly to take into account the number of clock cycles required by the controller to process the control information used to control the circuit. The up counter 518 commences counting the value in an upward direction until the next ZX pulse is received by the controller 502, at which time the count in the up counter 518 is outputted to an up/down counter 520 by way of bus 522. The up counter 518 is immediately cleared, reloaded with the value from block 516, and again begins counting the value up until receipt of the next ZX pulse.

The value provided to the up/down counter 520 will most likely be a number (either positive or negative) that is near zero, depending on whether the ZX pulse occurred just before or after the counter 518 reached zero during the count (it will readily be recognized that the value will be exactly zero when the actual Fcom period is equal to the nominal Fcom period). The sign bit from bus 522 is provided on signal path 523 to an UP input and an inverted DN input of the up/down counter 520, so that when the value is negative, the up/down counter 520 will be instructed to count up and when the value is positive, the up/down counter 520 will be instructed to count down. Upon receipt of a LOAD command from the controller 502 on signal path 524, the value on bus 522 is loaded into the up/down counter 520 and the up/down counter is enabled on the falling edge of the LOAD command (by way of D-latch 526 and output line 528). The sign bit on path 523 is also provided to D-latch 530 which, upon receipt of the falling edge of the LOAD command from path 524, outputs a signal on path 532 which is presented to both an exclusive OR (XOR) block 534 and a conventional tri-state output device 536. As the up/down counter 520 continues to count to zero (either up or down), the most significant Q-bit (MSQ) output remains at the same polarity as the polarity of the count until the count reaches zero. Signal path 538 connects the MSQ output signal to the XOR block 534 and the output from the XOR block 534 (which is a high logic state) is provided by signal path 540 to an enable (EN) input of the tri-state device 536. Thus, once the up/down counter 520 is enabled, it begins counting the value either up to zero (if it is negative) or down to zero (if it is positive) and a Pout signal is output by the tri-state device 536 on output line 542 with a polarity that is the same as that of the value being counted. At such time that the up/down counter 520 reaches zero, the tri-state device 536 is disabled, truncating the Pout signal on path 542. Additionally, the output from the XOR on path 540 (which at this time is at a low logic state) is inverted by an inverter 544 and the output is provided on signal path 546 to clear the D-latch 526.

Additionally, at the same time that the count value from the up counter 518 is provided on bus 522 to the up/down counter 520, the count value is also provided to a multiplexer 550 which also receives the LEARN signal from signal path 512 as a selection input, causing the value to be passed to a 16 bit adder 552. As with the circuits in FIGS. 9 and 10, the adder 552 sums the value with a value previously stored in RAM 554 so as to accumulate a total sum over the 32 mechanical revolutions of the LEARN mode. The RAM is addressed by the divider 506 (by way of address bus 556) and the previously stored 13 bit value is passed to a register 558 and output therefrom on bus 560 to a 10/13 bit shift module 562, which during the LEARN mode passes the value unchanged to the adder 552 by way of bus 564. The purpose for the 10/13 bit shift module 562 is to perform the divide by 32 (shift right five bits) operation during the characterization mode. The RAM is initialized so that it contains zeros in all 36 addresses at the start of the LEARN mode.

Upon the conclusion of the LEARN mode, the circuit of FIG. 14 enters the compensation mode, during which the stored values in the RAM 554 are used to generate the Pout signal on path 542. The general operation of the circuit during the compensation mode may be best understood by beginning with mux 550, which passes the value from block 516 to the 16 bit adder 552 and the total sum accumulated in RAM 554 is provided to the register 558, bus 560, and is shifted right by the 10/13 shift module 562 to effectuate the divide by 32 required to obtain an average value. This average value is thus presented to the adder 552 and summed with the value from block 516. The output of the adder 552 is provided by way of bus 566 to the mux 514, and from there to the up counter 518 which initiates a count up. As during the LEARN mode, the up counter 518 is stopped at the next ZX signal and the count obtained at that time is provided to the up/down counter 520, which operates as described hereinabove to generate the Pout signal as required on signal path 542.

Figure 15:
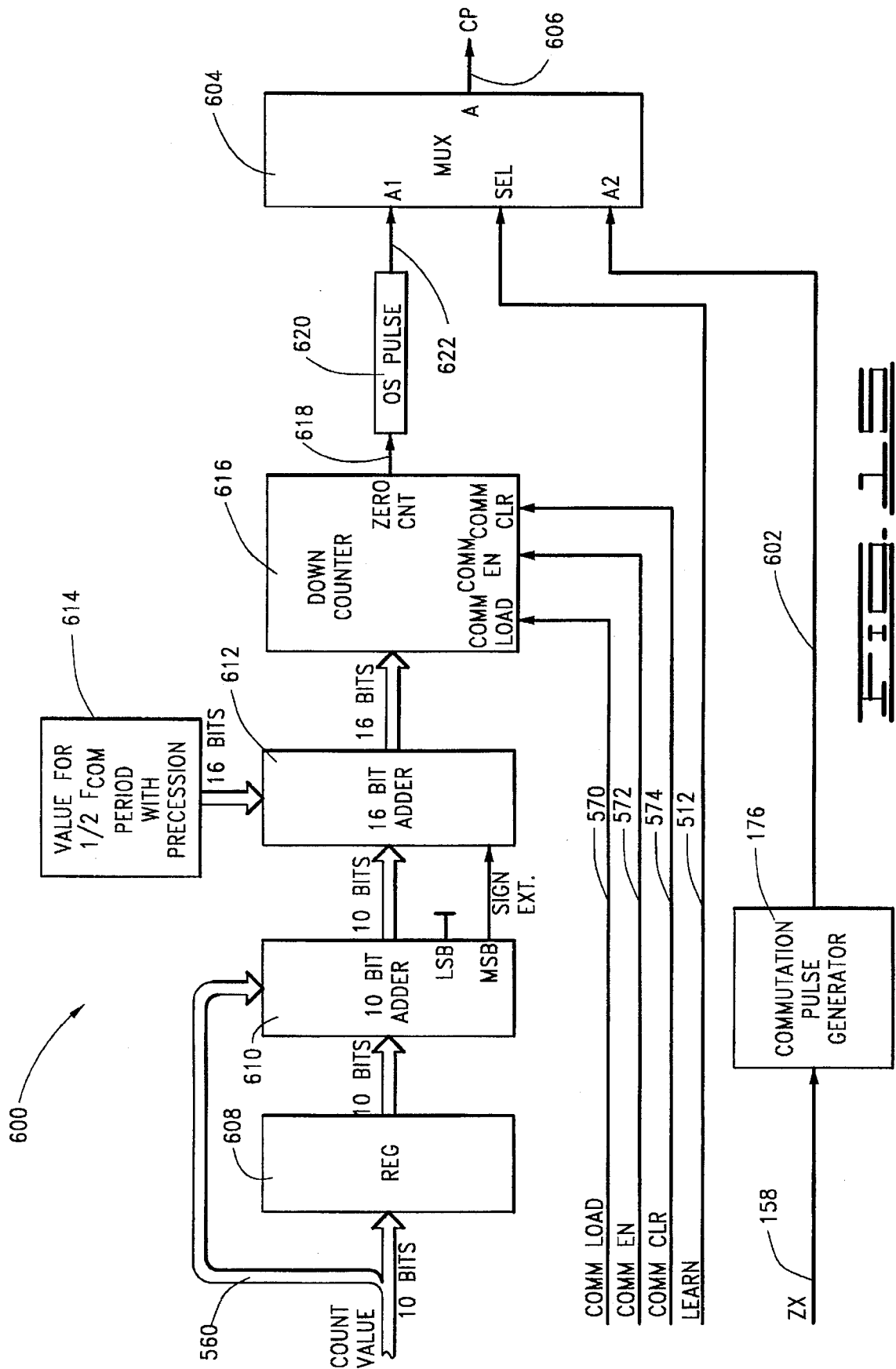
FIG. 15 is a schematic block diagram showing the preferred embodiment of the adaptive commutation timing generator of FIG. 13.

Referring again to FIG. 13, it can be seen that the adaptive speed control generator 500 provides several outputs to the adaptive commutation timing generator 600, which as previously discussed provides the commutation pulse (CP) timing pulses to the commutation logic 180 to commutate the motor. Turning to FIG. 15, shown therein is a schematic block diagram for the preferred embodiment for the adaptive commutation timing generator 600 for a frequency lock implementation,, constructed in accordance with the present invention. It will be recognized that the circuit of FIG. 15 is similar in construction and operation to the circuit of FIG. 11; more particularly, during the LEARN mode the commutation timing pulses are generated by the conventional commutation pulse generator 176 as hereinabove described and output on signal path 606 to the commutation logic 180 of FIG. 13 by way of signal path 602 and multiplexer 604. In this manner, during the LEARN mode the commutation timing is generated in a conventional manner.

At such time that the circuit enters the compensation mode of operation, the average data accumulated during the LEARN mode is used to improve the commutation timing. Particularly, the most significant 10 bits from the count value from bus 560 as shown in FIG. 14 are provided to a register 608 and also to an eleven bit adder 610. The purpose of the register 608 is to delay the received count value one Fcom period, so that the adder 610 receives a count value from the present period as well as the count value from the immediately preceding period, performs a summing operation on these two values, and provides a ten bit output to a 16 bit adder 612. Additionally, the most significant bit (MSB) from the adder 610 is provided as a sign extension to the adder 612 and the least significant bit (LSB) is dropped, effectuating a divide by two operation on the output.

As with the circuit of FIG. 11, the adder 612 is also provided with a constant 16 bit value from block 614, this value representing one-half of the nominal (ideal) Fcom period (plus or minus any precession value that may be used to slightly advance or delay the commutation timing to improve the torque characteristics of the motor). The resulting output of the adder 612 is a 16 bit positive number that represents the optimum commutation timing for the current commutation pulse (beyond the most recently obtained ZX pulse).

The output from the adder 612 is provided to a down counter 616, which is instructed to begin counting down to zero by the controller 502 (of FIG. 14). When the counter 616 reaches a zero count, a zero count signal is provided on signal path 618 to a one-shot 620, which outputs the commutation pulse on signal path 622 to the A1 input of the mux 604. As the circuit at this time is operating in the compensation mode, the LEARN signal has been previously toggled so that the mux 604 connects the input A1 to the output A, passing the compensated commutation pulse by way of output signal path 606 to the commutation logic circuit 180 of FIG. 13 at the required point in time.

As stated hereinabove, the present invention is limited to the error correction used by the loop, as preferred embodiments have been provided for both phase lock and frequency lock implementations. It will be recognized that the major differences between these two implementations include a higher clock frequency for the frequency lock approach (a clock of at least 10 MHz will keep quantization error down to 100 ns) as compared to the phase lock approach, and the use of a reference clock generator, which is required for the phase lock but not the frequency lock approach. Further, it will be understood with the present trend of circuit integration, it may be preferable to integrate the functional operations of the preferred embodiments disclosed above entirely into a DSP or other integrated circuit to carry out the steps set forth which comprise the invention.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A motor control circuit for providing commutation timing and speed control to an electrically commutated dc spindle motor, the spindle motor comprising a plurality of windings electrically connected in parallel to a center tap of the spindle motor, the spindle motor further having a predetermined number of reference frequency periods for each mechanical revolution of the spindle motor, the motor control circuit comprising:

frequency generation means for generating a sequence of reference signals at a preselected frequency, the preselected frequency corresponding to the number of reference frequency periods of the spindle motor;

a back emf sense circuit responsive to the spindle motor, the back emf sense circuit generating a sequence of zero crossing signals over each revolution of the spindle motor, the sequence of zero crossing signals generated from voltages of the windings and the center tap, each zero crossing signal generated when the voltage of a selected winding is nominally equal to the voltage of the center tap, the sequence of zero crossing signals defining a corresponding sequence of zero crossing periods, each zero crossing period comprising the duration of time between successive zero crossing signals;

characterization means, responsive to the back emf sense circuit, for identifying systematic variations in operational speed of the spindle motor, the characterization means including:
- speed control averaging means for determining an average phase difference for each zero crossing signal in the sequence of zero crossing signals, each average phase difference comprising the average of the phase difference between each zero crossing signal and a selected reference signal from the sequence of reference signals over a plurality of revolutions of the spindle motor; and
- commutation timing averaging means for determining an average zero crossing period for each zero crossing period in the sequence of zero crossing periods, each average zero crossing period comprising the average of the zero crossing periods over the plurality of revolutions of the spindle motor; and compensation means for compensating for the systematic variations in operational speed of the spindle motor, the compensation means including:
- speed control compensation means, responsive to the speed control averaging means, for outputting speed control timing signals in response to the average phase differences, the speed control timing signals controlling the speed of the spindle motor; and
- commutation timing compensation means, responsive to the commutation timing averaging means, for outputting commutation timing signals in response to the average zero crossing periods, the commutation timing signals controlling the commutation of the spindle motor.

2. A method for providing commutation timing and speed control to windings of an electrically commutated spindle motor in a circuit having a back emf sense circuit for generating a plurality of zero crossing signals in response to voltages sensed on the windings in a mechanical revolution of the spindle motor, the plurality of zero crossing signals defining a corresponding plurality of zero crossing periods, each zero crossing period comprising a duration of time between successive zero crossing signals the circuit further having a predetermined number of reference frequency periods for each mechanical revolution of the spindle motor, each reference frequency period having corresponding period boundaries, the method comprising the steps of:

identifying systematic variations in operational speed of the spindle motor, including the steps of:
- determining a plurality of average phase differences, each average phase difference comprising the phase difference between each zero crossing signal and selected period boundaries of the reference frequency periods over a plurality of revolutions of the spindle motor; and
- determining a plurality of average zero crossing periods, each average zero crossing period comprising an average duration of each of the plurality of zero crossing periods over the plurality, of revolutions of the spindle motor; and compensating for the systematic variations in operational speed of the spindle motor, including the steps of:
- generating speed control timing signals in response to the average phase differences and using the speed control timing signals to control the speed of the spindle motor; and
- generating commutation timing signals in response to the average zero crossing periods and using the commutation timing signals to commutate the spindle motor.

3. In a hard disc drive of the type having a multi-phase spindle motor and a back emf sense circuit, the spindle motor having a plurality of commutation frequency periods in a mechanical revolution, a method for compensating for variations in rotational speed of the spindle motor, comprising the steps of:

quantifying spindle motor rotational speed variations during a learn mode by commutating the spindle motor using back emf sensing, comprising the steps of:
- generating zero crossing signals in response to voltages of the spindle motor;
- generating commutation signals in response to the zero crossing signals; and
- using the commutation signals to commutate the spindle motor;

generating pump signals according to phase differences between the zero crossing signals, and reference pulses at a reference frequency; and averaging the lengths of the pump signals for each commutation frequency period and storing an associated average length value; and compensating for the spindle motor rotational speed variations, by generating adaptive pump signals according to phase differences between the zero crossing signals and adapted reference pulses, each adapted reference pulse comprising the reference pulse adjusted by the associated average length value; and using the adaptive pump signals to control the rotational speed of the spindle motor.

4. In a disc drive having a multi-phase spindle motor and a back emf sense circuit for providing zero crossing signals in response to voltages sensed from the spindle motor during rotation of the spindle motor, the spindle motor having a plurality of nominal zero crossings associated with each mechanical revolution of the spindle motor, each nominal zero crossing indicating a point in time at which a nominal zero crossing signal would be generated by the back emf sense circuit as a result of operation of the spindle motor without variations in rotational speed, a method for minimizing variations in rotational speed of the spindle motor comprising the steps of:

identifying a timing error associated with each zero crossing signal within a mechanical revolution of the. spindle motor by determining an average phase difference between each zero crossing signal provided by the back emf sense circuit and each associated nominal zero crossing, over a plurality of mechanical revolutions; and compensating for the timing error associated with each zero crossing signal provided by the back emf sense circuit by using the average phase difference to identify an adaptive zero crossing signal for each zero crossing signal provided by the back emf sense circuit; and using the adaptive zero crossing signals to control the rotational speed of the spindle motor.

5. The method of claim 4, wherein the step of using the adaptive zero crossing signals to control the rotational speed of the spindle motor comprises the steps of:

generating adaptive pump-up and pump-down signals from phase differences between the adaptive zero crossing signals and reference pulses provided at a reference frequency; and using the adaptive pump-up and pump-down signals to control the rotational speed of the spindle motor.

6. The method of claim 4, wherein the disc drive further comprises nominal zero crossing periods, each nominal zero crossing period comprising a duration of time between successive nominal zero crossings, and wherein the step of using the adaptive zero crossing signals to control the rotational speed of the spindle motor comprises the steps of:

generating adaptive phase difference signals, each adaptive phase difference signal comprising a phase difference between each nominal zero crossing period and each adaptive zero crossing period, each adaptive zero crossing period comprising a duration of time between successive adaptive zero crossing signals; and using the adaptive phase difference signals to control the rotational speed of the spindle motor.

7. In a disc drive having a multi-phase spindle motor and a back emf sense circuit for providing zero crossing signals in response to voltages sensed from the spindle motor during rotation of the spindle motor, the spindle motor having a plurality of nominal zero crossings associated with each mechanical revolution of the spindle motor, each nominal zero crossing indicative of a nominal zero crossing signal generated by the back emf sense circuit as a result of operation of the spindle motor without variations in rotational speed, an apparatus for minimizing variations in rotational speed of the spindle motor comprising:

zero crossing error means for characterizing error associated with the timing of each zero crossing signal provided by the back emf sense circuit over a mechanical revolution of the spindle motor, wherein the error is characterized as an average phase difference between each zero crossing signal and each associated nominal zero crossing, over a plurality of mechanical revolutions; and zero crossing compensation means, responsive to the zero crossing error means, for compensating for the error associated with each zero crossing by using the average phase difference to identify an adaptive zero crossing signal for each zero crossing signal provided by the back emf sense circuit; and using the adaptive zero crossing signals to control the rotational speed of the spindle motor.

8. The apparatus of claim 7, wherein the zero crossing error means comprises:

a phase detector for identifying the phase difference between each zero crossing signal and each associated nominal zero crossing;

averaging means, responsive to the phase detector, for averaging the phase differences for each nominal zero crossing; and storage means, responsive to the averaging means, for storing the average phase differences for each nominal zero crossing.

9. The apparatus of claim 7, wherein the zero crossing error means further comprises:

adaptive means for generating adaptive pump-up and pump-down signals from phase differences between the adaptive zero crossing signals and reference pulses provided at a reference frequency; and control means, responsive to the adaptive means, for controlling the rotational speed of the spindle motor using the adaptive pump-up and pump-down signals.

10. The apparatus of claim 7, wherein the disc drive further comprises nominal zero crossing periods, each nominal zero crossing period comprising a duration of time between successive nominal zero crossings, and wherein the zero crossing error means further comprises:

adaptive phase difference signal means for generating adaptive phase difference signals, each adaptive phase difference signal comprising a phase difference between each nominal zero crossing period and each adaptive zero crossing period, each adaptive zero crossing period comprising a duration of time between successive adaptive zero crossing signals; and control means, responsive to the adaptive phase difference signal means, for controlling the rotational speed of the spindle motor using the adaptive phase difference signals.

11. In a disc drive having a spindle motor, a back emf sense circuit, and a clock for providing reference pulses at a reference frequency, the reference pulses defining a plurality of nominal zero crossing periods within a mechanical revolution of the spindle motor, the reference pulses further defining a plurality of nominal commutation steps defined as occurring in the center of each nominal zero crossing period, a method for minimizing variations in rotational speed of the spindle motor by adaptively selecting commutation steps for the spindle motor, comprising the steps of:

identifying error associated with each commutation step within a mechanical revolution of the spindle motor by determining an average phase difference between one-half of each zero crossing period and one-half of the nominal zero crossing period, over a plurality of mechanical revolutions; and compensating for the error associated with each commutation step by placing each commutation step at an adaptive commutation step located at the associated nominal commutation step offset by the average phase difference.

12. In a disc drive having a spindle motor, a back emf sense circuit, and a clock for providing reference pulses at a reference frequency, the reference pulses defining a plurality of nominal zero crossing periods within a mechanical revolution of the spindle motor, the reference pulses further defining a plurality of nominal commutation steps defined as occurring in the center of each nominal zero crossing period, an apparatus for minimizing variations in rotational speed of the spindle motor by adaptively selecting commutation steps for the spindle motor, comprising the steps of:

commutation step error means for identifying error associated with each commutation step within a mechanical revolution of the spindle motor, wherein the error is identified an average phase difference between one-half of each zero crossing period and one-half of the nominal zero crossing period, over a plurality of mechanical revolutions; and commutation step compensation means, responsive to the commutation step error means, for compensating for the error associated with each commutation step by placing each commutation step at an adaptive commutation step located at the associated nominal commutation step offset by the average phase difference.

* * * * *

UNITED STATES PATENT AND TRADEMARK OFFICE
CERTIFICATE OF CORRECTION

PATENT NO. : 5,631,999
DATED : May 20, 1997
INVENTOR(S) : Stanley H. Dinsmore

It is certified that error appears in the above-indentified patent and that said Letters Patent is hereby corrected as shown below:

Column 21, line 37, after the word "implementation", delete the second comma ",".

Column 8, line 30, immediately after the word "(Fref" and before the word "provided", insert a parenthetical mark --)--.

Column 10, line 39, after the word "FIG." and before the word "at", insert --7--.

Column 13, line 36, delete the word "From", and insert --Foom--.

Column 17, line 26, delete "0f" and insert --Of--.

Column 18, line 48, delete the word "servo".

Column 23, line 39, immediately after the word "signal" and before the word "the", insert a comma --,--.

Signed and Sealed this

Twenty-eighth Day of October, 1997

Attest:

BRUCE LEHMAN

*Attesting Officer*  *Commissioner of Patents and Trademarks*